United States Patent
Xiang et al.

(10) Patent No.: US 11,477,682 B2
(45) Date of Patent: Oct. 18, 2022

(54) RADIO LINK MONITORING METHOD AND APPARATUS

(71) Applicant: HUAWEI TECHNOLOGIES CO., LTD., Guangdong (CN)

(72) Inventors: Zhengzheng Xiang, Shanghai (CN); Jun Luo, Kista (SE); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 90 days.

(21) Appl. No.: 17/038,889

(22) Filed: Sep. 30, 2020

(65) Prior Publication Data

US 2021/0014717 A1 Jan. 14, 2021

Related U.S. Application Data

(63) Continuation of application No. PCT/CN2019/081283, filed on Apr. 3, 2019.

(30) Foreign Application Priority Data

Apr. 4, 2018 (CN) .......................... 201810301446.6

(51) Int. Cl.
| | |
|---|---|
| *H04W 24/10* | (2009.01) |
| *H04W 36/08* | (2009.01) |
| *H04W 36/30* | (2009.01) |
| *H04W 36/06* | (2009.01) |
| *H04W 72/04* | (2009.01) |

(52) U.S. Cl.
CPC ........... *H04W 24/10* (2013.01); *H04W 36/06* (2013.01); *H04W 36/08* (2013.01); *H04W 36/30* (2013.01); *H04W 72/0453* (2013.01)

(58) Field of Classification Search
None
See application file for complete search history.

(56) References Cited

U.S. PATENT DOCUMENTS

| 2017/0041112 A1 | 2/2017 | Kim et al. |
| 2019/0052377 A1* | 2/2019 | Hwang ................. H04L 5/0035 |

(Continued)

FOREIGN PATENT DOCUMENTS

| CN | 101969662 A | 2/2011 |
| CN | 102149143 A | 8/2011 |

(Continued)

OTHER PUBLICATIONS

InterDigital, Inc.,"Remaining details of BWP," 3GPP TSG RAN WG1 Meeting AH_NR#3, R1-1718365, Prague, CZ, Oct. 9-13, 2017, 6 pages.

(Continued)

*Primary Examiner* — Saba Tsegaye
(74) *Attorney, Agent, or Firm* — Fish & Richardson P.C.

(57) ABSTRACT

Example radio link monitoring methods and apparatus are described. One example method includes performing radio link monitoring (RLM) in a second bandwidth part (BWP) by a terminal device. The terminal device receives first switching information from a network device that is used to indicate that an active BWP includes a first BWP, and switches from the second BWP to the first BWP based on the first switching information. The terminal device removes a measurement result obtained by performing RLM in the second BWP, where the measurement result includes a quantity N1 of one or more out of synchronization (OOS) states or a quantity N2 of one or more in synchronization (IS) states. RLM is performed in the first BWP.

7 Claims, 13 Drawing Sheets

(56) References Cited

U.S. PATENT DOCUMENTS

2019/0132845 A1* 5/2019 Babaei ................. H04L 1/1812
2019/0261244 A1* 8/2019 Jung .................... H04L 5/0053

FOREIGN PATENT DOCUMENTS

CN          106712913 A     5/2017
WO       2015192315 A1   12/2015

OTHER PUBLICATIONS

Intel, "[Draft] LS on RLM in active DL BWP," 3GPP TSG-RAN WG1 Meeting #91, R1-1721694, Reno, Nevada, USA, Nov. 27-Dec. 1, 2017, 1 page.
PCT International Search Report and Written Opinion issued in International Application No. PCT/CN2019/081283 dated Jun. 17, 2019, 17 pages (with English translation).
RAN1, "LS on RLM in active DL BWP," 3GPP TSG-RAN WG1 Meeting #91, R1-1721721, Reno, Nevada, USA, Nov. 27-Dec. 1, 2017, 1 page.
Samsung, "RLM/RLF for bandwidth part," 3GPP TSG-RAN WG2 #99bis, R2-1711404, Prague, Czech, Oct. 9-13, 2017, 3 pages.
Ericsson, "BWP impact to RLM configuration (E396)," 3GPP TSG-RAN WG2 #101, R2-1802780, Athens, Greece, Feb. 26-Mar. 2, 2018, 4 pages.
NEC, "RLM/RRM measurements after BWP switching," 3GPP TSG-RAN WG2 NR Ad hoc 1801, R2-1801139, Vancouver, Canada, Jan. 22-26, 2018, 4 pages.
Supplementary European Search Report in European Application No. 19781010.4 dated Apr. 14, 2021, 20 pages.

* cited by examiner

RADIO LINK MONITORING METHOD AND APPARATUS

CROSS-REFERENCE TO RELATED APPLICATIONS

This application is a continuation of International Application No. PCT/CN 2019/081283, filed on Apr. 3, 2019, which claims priority to Chinese Patent Application No. 201810301446.6, filed on Apr. 4, 2018. The disclosures of the aforementioned applications are hereby incorporated by reference in their entireties.

TECHNICAL FIELD

This application relates to the communications field, and more specifically, to a radio link monitoring method and apparatus in the communications field.

BACKGROUND

In a wireless communications technology, radio link quality (or channel quality) is an important parameter for ensuring normal data transmission. To enable a system to learn of radio link quality in time, a terminal device may perform radio link monitoring (RLM) in a bandwidth. Simply, the terminal device may periodically measure the bandwidth by using a reference signal used for the RLM, and generate a measurement result used to indicate the radio link quality, to report the measurement result to a higher layer of the terminal device. The measurement result may include a quantity of out of synchronization (OOS) states or a quantity of in synchronization (IS) states.

In addition, in a 5G system, a bandwidth part (BWP) is proposed, and the BWP is a part of a system bandwidth. A network device may configure a plurality of BWPs for the terminal device, and the terminal device may perform RLM in an active BWP in the plurality of BWPs.

In an application scenario, in a first time period, the terminal device performs RLM in a BWP #A, to generate a corresponding measurement result #A. In a second time period, the terminal device needs to switch from the BWP #A to a BWP #B, and when performing RLM in the BWP #B, the terminal device continues to perform RLM based on the measurement result #A.

In this case, the measurement result #A generated by the terminal device by performing RLM in the BWP #A cannot accurately reflect a radio link status in the BWP #B. Consequently, accuracy of the RLM performed by the terminal device in the BWP #B is reduced, and communication quality is affected.

Therefore, a technology needs to be provided to improve the accuracy of the RLM performed in a process in which the terminal device performs RLM after switching the BWP, thereby improving the communication quality.

SUMMARY

This application provides a radio link monitoring method and apparatus, to improve accuracy of RLM and further improve communication quality.

According to a first aspect, a radio link monitoring method is provided. The method includes:

performing, by a terminal device, radio link monitoring RLM in a second bandwidth part BWP;

receiving, by the terminal device, first switching information sent by a network device, where the first switching information is used to indicate that an active bandwidth part BWP includes a first BWP;

switching, by the terminal device, from the second BWP to the first BWP based on the first switching information:

removing, by the terminal device, a measurement result obtained by performing RLM in the second BWP, where the measurement result includes a quantity N1 of at least some out of synchronization OOS states or a quantity N2 of at least some in synchronization IS states; and performing, by the terminal device, RLM in the first BWP.

Therefore, according to the radio link monitoring method provided in this embodiment of this application, after switching from the second BWP in which the RLM is currently performed to the first BWP, the terminal device removes the measurement result obtained by performing RLM in the second BWP, where the measurement result is all or some of measurement results obtained by performing RLM in the second BWP, so that the terminal device does not use the measurement result in a process of performing RLM in the first BWP, to avoid a problem in the prior art that accuracy of the RLM is relatively low because all the measurement results are used in the process of performing RLM in the first BWP, thereby effectively improving accuracy of the RLM performed by the terminal device in the first BWP that is switched to, and further improving communication quality.

In a possible implementation, the removing, by the terminal device, a measurement result obtained by performing RLM in the second BWP includes:

counting, by the terminal device starting from P1, a quantity of consecutive OOS states, where the measurement result includes the quantity N1 of at least some OOS states, P1=Q1−N1. Q1 is a quantity of consecutive OOS states that is counted by the terminal device by performing RLM in the second BWP, and N1 is less than or equal to Q1; or counting, by the terminal device starting from P2, a quantity of consecutive IS states, where the measurement result includes the quantity N2 of at least some IS states, P2=Q2−N2, Q2 is a quantity of consecutive IS states that is counted by the terminal device by performing RLM in the second BWP, and N2 is less than or equal to Q2.

In a possible implementation, the measurement result further includes at least partial duration T1 of total duration recorded from a time at which an RLM timer is enabled to a time at which the RLM timer is stopped; and the removing, by the terminal device, a measurement result obtained by performing RLM in the second BWP includes:

starting, by the terminal device, timing from T2, where T2=T−T1, T is the total duration recorded from the time at which the RLM timer is enabled to the time at which the RLM timer is stopped, and T1 is less than or equal to T.

In a possible implementation, the first BWP and the second BWP do not overlap at all or partially overlap.

In a possible implementation, the method further includes:

receiving, by the terminal device, indication information sent by the network device, where the indication information is used to indicate the terminal device to remove the measurement result in the process of performing RLM in the first BWP.

In a possible implementation, the method further includes:

storing, by the terminal device, the measurement result;

receiving, by the terminal device, second switching information, where the second switching information is used to indicate the second BWP:

switching, by the terminal device, from the first BWP to the second BWP based on the second switching information; and performing, by the terminal device, RLM in the second BWP based on the measurement result.

In a possible implementation, the performing, by the terminal device, RLM in the second BWP based on the measurement result includes:

counting, by the terminal device starting from N1, a quantity of consecutive OOS states, where the measurement result includes the quantity N1 of OOS states; or counting, by the terminal device starting from N2, a quantity of consecutive IS states, where the measurement result includes the quantity N2 of IS states.

In a possible implementation, the measurement result further includes at least partial duration T1 of total duration recorded from a time at which an RLM timer is enabled to a time at which the RLM timer is stopped; and the performing, by the terminal device. RLM in the second BWP based on the measurement result includes:

starting, by the terminal device, timing from T1.

According to a second aspect, a radio link monitoring method is provided. The method includes:

performing, by a terminal device, radio link monitoring RLM in a second bandwidth part BWP;

receiving, by the terminal device, first switching information sent by a network device, where the first switching information is used to indicate that an active bandwidth part BWP includes a first BWP;

switching, by the terminal device, from the second BWP to the first BWP based on the first switching information;

receiving, by the terminal device, indication information sent by the network device, where the indication information is used to indicate the terminal device to continue to use, in a process of performing RLM in the first BWP, a measurement result obtained by performing RLM in the second BWP; and the measurement result includes a quantity N1 of at least some out of synchronization OOS states or a quantity N2 of at least some in synchronization IS states; and performing, by the terminal device, RLM in the first BWP based on the measurement result.

Therefore, according to the radio link monitoring method provided in this embodiment of this application, the network device sends, to the terminal device, the indication information used to indicate the terminal device to continue to use, in the process of performing RLM in the first BWP, the measurement result obtained by performing RLM in the second BWP, where the measurement result is all or some of measurement results obtained by performing RLM in the second BWP, so that the terminal device may continue to use the measurement result in the process of performing RLM in the first BWP, thereby improving RLM efficiency.

In a possible implementation, the first BWP and the second BWP partially overlap, or the first BWP and the second BWP do not overlap.

In a possible implementation, the performing, by the terminal device, RLM in the first BWP based on the measurement result includes:

counting, by the terminal device starting from N1, a quantity of consecutive OOS states, where the measurement result includes the quantity N1 of at least some OOS states; or counting, by the terminal device starting from N2, a quantity of consecutive IS states, where the measurement result includes the quantity N2 of at least some IS states.

In a possible implementation, the measurement result further includes at least partial duration T1 of total duration recorded from a time at which an RLM timer is enabled to a time at which the RLM timer is stopped; and the performing, by the terminal device, RLM in the first BWP based on the measurement result includes:

starting, by the terminal device, timing from T1.

According to a third aspect, a radio link monitoring method is provided. The method includes:

performing, by a terminal device, radio link monitoring RLM in a second bandwidth part BWP;

receiving, by the terminal device, first switching information sent by a network device, where the first switching information is used to indicate that an active BWP includes a first BWP;

switching, by the terminal device, from the second BWP to the first BWP based on the first switching information;

storing, by the terminal device, a measurement result obtained by performing RLM in the second BWP, where the measurement result includes a quantity N1 of at least some out of synchronization OOS states or a quantity N2 of at least some in synchronization IS states:

performing, by the terminal device. RLM in the first BWP;

receiving, by the terminal device, second switching information sent by the network device, where the second switching information is used to indicate that the active BWP includes the second BWP:

switching, by the terminal device, from the first BWP to the second BWP based on the second switching information; and performing, by the terminal device, RLM in the second BWP based on the measurement result.

Therefore, according to the radio link monitoring method provided in this application, after switching from the second BWP in which the RLM is currently performed to the first BWP, the terminal device may store the measurement result obtained by performing RLM in the second BWP, where the measurement result is all or some of measurement results obtained by performing RLM in the second BWP, so that after subsequently switching from the first BWP to the second BWP, the terminal device may continue to perform RLM in the second BWP by continuing to use the measurement result, thereby reducing implementation complexity.

In a possible implementation, the performing, by the terminal device, RLM in the second BWP based on the measurement result includes:

counting, by the terminal device starting from N1, a quantity of consecutive OOS states, where the measurement result includes the quantity N1 of at least some OOS states; or counting, by the terminal device starting from N2, a quantity of consecutive IS states, where the measurement result includes the quantity N2 of at least some IS states.

In a possible implementation, the measurement result further includes at least partial duration T1 of total duration recorded from a time at which an RLM timer is enabled to a time at which the RLM timer is stopped; and the performing, by the terminal device, RLM in the second BWP based on the measurement result includes:

starting, by the terminal device, timing from T1.

According to a fourth aspect, a radio link monitoring method is provided. The method includes:

receiving, by a terminal device, first indication information sent by a network device, where the first indication information is used to indicate that active bandwidth parts BWPs include M BWPs, and M is an integer greater than 1:

performing, by the terminal device, RLM in K BWPs of the M BWPs based on the first indication information, where K is an integer greater than 1, and K is less than or equal to M; and reporting, by the terminal device, a measurement result to a higher layer of the terminal device, where the measurement result includes an out of synchronization OOS state or an in synchronization IS state.

Therefore, according to the radio link monitoring method provided in this embodiment of this application, when the terminal device can perform wireless communication by using the M BWPs, the terminal device can determine a radio link status of the terminal device by performing RLM in the K BWPs of the M BWPs, thereby effectively reducing complexity of the RLM.

In a possible implementation, the reporting, by the terminal device, a measurement result to a higher layer of the terminal device includes:

averaging, by the terminal device, K measurement values that are obtained by performing RLM in the K BWPs in a first time period, to obtain a first average measurement value, where the K BWPs correspond one-to-one to the K measurement values; and if a bit error rate obtained based on the first average measurement value is greater than a preset threshold, reporting, by the terminal device, the OOS state.

In a possible implementation, the reporting, by the terminal device, a measurement result to a higher layer of the terminal device includes:

averaging, by the terminal device, K measurement values that are obtained by performing RLM in the K BWPs in a second time period, to obtain a second average measurement value, where the K BWPs correspond one-to-one to the K measurement values; and if a bit error rate obtained based on the second average measurement value is less than a preset threshold, reporting, by the terminal device, the IS state.

In a possible implementation, the reporting, by the terminal device, a measurement result to a higher layer of the terminal device includes:

performing, by the terminal device, RLM in the K BWPs in a third time period, to obtain K bit error rates that correspond one-to-one to the K BWPs; and if L1 bit error rates of the K bit error rates are all greater than a preset threshold, reporting, by the terminal device, the OOS state, where L1 is an integer greater than or equal to 1, and L1 is less than or equal to K.

In a possible implementation, the reporting, by the terminal device, a measurement result to a higher layer of the terminal device includes:

performing, by the terminal device, RLM in the K BWPs in a fourth time period, to obtain K bit error rates that correspond one-to-one to the K BWPs; and if L2 bit error rates of the K bit error rates are less than a preset threshold, reporting, by the terminal device, the IS state, where L2 is an integer greater than or equal to 1, and L2 is less than or equal to K.

In a possible implementation, the method further includes:

receiving, by the terminal device, second indication information sent by the network device, where the second indication information is used to indicate the K BWPs, and K is less than M; and the performing, by the terminal device, RLM in K BWPs of the M BWPs based on the first indication information includes:

performing, by the terminal device, RLM in the K BWPs of the M BWPs based on the first indication information and the second indication information.

According to a fifth aspect, a radio link monitoring method is provided. The method includes:

performing, by a terminal device, radio link monitoring RLM in S second bandwidth parts BWPs, where S is an integer greater than 1;

receiving, by the terminal device, first switching information sent by a network device, where the first switching information is used to indicate that active BWPs include M first BWPs, and M is an integer greater than 1;

switching, by the terminal device, from the S second BWPs to the M first BWPs based on the first switching information;

removing, by the terminal device, a measurement result obtained by performing RLM in the S second BWPs, where the measurement result includes a quantity N3 of at least some out of synchronization OOS states or a quantity N4 of at least some in synchronization IS states; and performing, by the terminal device, RLM in K first BWPs of the M first BWPs, where K is an integer greater than 1, and K is less than or equal to M.

In a possible implementation, the removing, by the terminal device, a measurement result obtained by performing RLM in the S second BWPs includes:

counting, by the terminal device starting from P3, a quantity of consecutive OOS states, where the measurement result includes the quantity N3 of at least some OOS states, P3=Q3−N3. Q3 is a quantity of consecutive OOS states that is counted by the terminal device by performing RLM in the S second BWPs, and N3 is less than or equal to Q3; or counting, by the terminal device starting from P4, a quantity of consecutive IS states, where the measurement result includes the quantity N4 of at least some IS states, P4=Q4−N4, Q4 is a quantity of consecutive IS states that is counted by the terminal device by performing RLM in the S second BWPs. and N4 is less than or equal to Q4.

In a possible implementation, the measurement result further includes at least partial duration T3 of total duration recorded from a time at which an RLM timer is enabled to a time at which the RLM timer is stopped; and the removing, by the terminal device, a measurement result obtained by performing RLM in the S second BWPs includes:

starting, by the terminal device, timing from T4, where T4=T−T3, T is the total duration recorded from the time at which the RLM timer is enabled to the time at which the RLM timer is stopped, and T3 is less than or equal to T.

In a possible implementation, the M first BWPs and the S second BWPs do not overlap at all or partially overlap.

In a possible implementation, the method further includes:

receiving, by the terminal device, indication information sent by the network device, where the indication information is used to indicate the terminal device to remove the measurement result in a process of performing RLM in the M first BWPs.

In a possible implementation, the performing, by the terminal device. RLM in K first BWPs of the M first BWPs includes:

averaging, by the terminal device, K measurement values that are obtained by performing RLM in the K BWPs in a first time period, to obtain a first average measurement value, where the K BWPs correspond one-to-one to the K measurement values; and if a bit error rate obtained based on the first average measurement value is greater than a preset threshold, reporting, by the terminal device, the OOS state.

In a possible implementation, the performing, by the terminal device, RLM in K first BWPs of the M first BWPs includes:

averaging, by the terminal device, K measurement values that are obtained by performing RLM in the K BWPs in a second time period, to obtain a second average measurement value, where the K BWPs correspond one-to-one to the K measurement values; and if a bit error rate obtained based on the second average measurement value is less than a preset threshold, reporting, by the terminal device, the IS state.

In a possible implementation, the performing, by the terminal device, RLM in K first BWPs of the M first BWPs includes:

performing, by the terminal device, RLM in the K BWPs in a third time period, to obtain K bit error rates that correspond one-to-one to the K BWPs; and if L1 bit error rates of the K bit error rates are all greater than a preset threshold, reporting, by the terminal device, the OOS state, where L1 is an integer greater than or equal to 1, and L1 is less than or equal to K.

In a possible implementation, the performing, by the terminal device, RLM in K first BWPs of the M first BWPs includes:

performing, by the terminal device, RLM in the K BWPs in a fourth time period, to obtain K bit error rates that correspond one-to-one to the K BWPs; and if L2 bit error rates of the K bit error rates are all less than a preset threshold, reporting, by the terminal device, the IS state, where L2 is an integer greater than or equal to 1, and L2 is less than or equal to K.

In a possible implementation, the method further includes:

receiving, by the terminal device, second indication information sent by the network device, where the second indication information is used to indicate the K BWPs, and K is less than M; and the performing, by the terminal device, RLM in K first BWPs of the M first BWPs includes:

performing, by the terminal device, RLM in the K BWPs based on the second indication information.

According to a sixth aspect, a radio link monitoring method is provided. The method includes:

performing, by a terminal device, radio link monitoring RLM in S second bandwidth parts BWPs, where S is an integer greater than 1;

receiving, by the terminal device, first switching information sent by a network device, where the first switching information is used to indicate that active bandwidth parts BWPs include M first BWPs, and M is an integer greater than 1;

switching, by the terminal device, from the S second BWPs to the M first BWPs based on the first switching information;

receiving, by the terminal device, indication information sent by the network device, where the indication information is used to indicate the terminal device to continue to use, in a process of performing RLM in the M first BWPs, a measurement result obtained by performing RLM in the S second BWPs; and the measurement result includes a quantity N3 of at least some out of synchronization OOS states or a quantity N4 of at least some in synchronization IS states; and performing, by the terminal device. RLM in the M first BWPs based on the measurement result.

In a possible implementation, the M first BWPs and the S second BWPs partially overlap, or the M first BWPs and the S second BWPs do not overlap.

In a possible implementation, the performing, by the terminal device, RLM in the M first BWPs based on the measurement result includes:

counting, by the terminal device starting from N3, a quantity of consecutive OOS states, where the measurement result includes the quantity N3 of at least some OOS states; or counting, by the terminal device starting from N4, a quantity of consecutive IS states, where the measurement result includes the quantity N4 of at least some IS states.

In a possible implementation, the measurement result further includes at least partial duration T3 of total duration recorded from a time at which an RLM timer is enabled to a time at which the RLM timer is stopped; and the performing, by the terminal device, RLM in the M first BWPs based on the measurement result includes:

starting, by the terminal device, timing from T3.

According to a seventh aspect, a radio link monitoring method is provided. The method includes:

performing, by a terminal device, radio link monitoring RLM in S second bandwidth parts BWPs, where S is an integer greater than 1:

receiving, by the terminal device, first switching information sent by a network device, where the first switching information is used to indicate that active BWPs include M first BWPs, and M is an integer greater than 1:

switching, by the terminal device, from the S second BWPs to the M first BWPs based on the first switching information;

storing, by the terminal device, a measurement result obtained by performing RLM in the S second BWPs, where the measurement result includes a quantity N3 of at least some out of synchronization OOS states or a quantity N4 of at least some in synchronization IS states;

performing, by the terminal device, RLM in the M first BWPs:

receiving, by the terminal device, second switching information sent by the network device, where the second switching information is used to indicate S1 second BWPs of the S second BWPs, and S1 is an integer greater than or equal to 1;

switching, by the terminal device, from the M first BWPs to the S1 second BWPs based on the second switching information; and performing, by the terminal device, RLM in the S1 second BWPs based on the measurement result.

In a possible implementation, the performing, by the terminal device, RLM in the S second BWPs based on the measurement result includes:

counting, by the terminal device starting from N3, a quantity of consecutive OOS states, where the measurement result includes the quantity N3 of at least some OOS states; or counting, by the terminal device starting from N4, a quantity of consecutive IS states, where the measurement result includes the quantity N4 of at least some IS states.

In a possible implementation, the measurement result further includes at least partial duration T3 of total duration recorded from a time at which an RLM timer is enabled to a time at which the RLM timer is stopped; and the performing, by the terminal device, RLM in the S1 second BWPs based on the measurement result includes:

starting, by the terminal device, timing from T3.

According to an eighth aspect, a radio link monitoring method is provided. The method includes:

sending, by a network device, indication information to a terminal device, where the indication information is used to indicate the terminal device to remove, in a process of performing RLM in a first BWP included in an active bandwidth part, a measurement result obtained by the terminal device by performing RLM in a second BWP; and the measurement result includes a quantity N1 of at least some out of synchronization OOS states or a quantity N2 of at least some in synchronization IS states.

According to a ninth aspect, a radio link monitoring method is provided. The method includes:

sending, by a network device, first switching information to a terminal device, where the first switching information is used to indicate that an active bandwidth part BWP includes a first BWP; and sending, by the network device, indication information to the terminal device, where the indication information is used to indicate the terminal device to continue to use, in a process of performing RLM in the first BWP, a measurement result obtained by performing RLM in a second BWP; and the measurement result includes a quantity N1 of at least some out of synchronization OOS states or a quantity N2 of at least some in synchronization IS states.

According to a tenth aspect, a radio link monitoring method is provided. The method includes:

sending, by a network device, first indication information to a terminal device, where the first indication information is used to indicate that active bandwidth parts BWPs include M BWPs, and M is an integer greater than 1.

In a possible implementation, the method further includes:

sending, by the network device, second indication information to the terminal device, where the second indication information is used to indicate K BWPs, and K is less than M.

According to an eleventh aspect, a radio link monitoring apparatus is provided. The apparatus may be configured to perform operations of the terminal device according to any one of the first aspect to the seventh aspect or the possible implementations of the first aspect to the seventh aspect. Specifically, the apparatus may include modules or units configured to perform the operations of the terminal device according to any one of the possible implementations of the first aspect to the seventh aspect.

According to a twelfth aspect, a radio link monitoring apparatus is provided. The apparatus may be configured to perform operations of the network device according to any one of the eighth aspect to the tenth aspect or the possible implementations of the eighth aspect to the tenth aspect. Specifically, the apparatus may include modules or units configured to perform the operations of the network device according to any one of the possible implementations of the eighth aspect to the tenth aspect.

According to a thirteenth aspect, a terminal device is provided. The terminal device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution enables the terminal device to perform the method according to any one of the possible implementations of the first aspect to the seventh aspect, or the execution enables the terminal device to implement the apparatus according to the eleventh aspect.

According to a fourteenth aspect, a network device is provided. The network device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution enables the network device to perform the method according to any one of the possible implementations of the eighth aspect to the tenth aspect, or the execution enables the network device to implement the apparatus according to the twelfth aspect.

According to a fifteenth aspect, a chip system is provided. The chip system includes a memory and a processor. The memory is configured to store a computer program, and the processor is configured to invoke the computer program from the memory and run the computer program, so that a communications device in which the chip system is installed performs the method according to any one of the first aspect to the tenth aspect or the possible implementations of the first aspect to the tenth aspect.

According to a sixteenth aspect, a computer program product is provided. The computer program product includes computer program code. When the computer program code is run by a communications unit, a processing unit, a transceiver, or a processor of a communications device (for example, a network device or a terminal device), the communications device is enabled to perform the method according to any one of the first aspect to the tenth aspect or the possible implementations of the first aspect to the tenth aspect.

According to a seventeenth aspect, a computer-readable storage medium is provided. The computer-readable storage medium stores a program, and the program enables a communications device (for example, a network device or a terminal device) to perform the method according to any one of the first aspect to the tenth aspect or the possible implementations of the first aspect to the tenth aspect.

According to an eighteenth aspect, a computer program is provided. When the computer program is executed on a computer, the computer is enabled to implement the method according to any one of the first aspect to the tenth aspect or the possible implementations of the first aspect to the tenth aspect.

In some of the foregoing implementations, the method further includes:

receiving, by the terminal device, third indication information sent by the network device, where the third indication information is used to indicate L1.

In some of the foregoing implementations, the method further includes: receiving, by the terminal device, third indication information sent by the network device, where the third indication information is used to indicate L2.

DESCRIPTION OF EMBODIMENTS

The following describes technical solutions of this application with reference to the accompanying drawings.

The technical solutions of the embodiments of this application may be applied to various communications systems, such as a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, a future 5th generation (5G) system, or a new radio (NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in a global system for mobile communications (GSM) system or a code division multiple access (CDMA) system, may be a NodeB (NB) in a wideband code division multiple access (WCDMA) system, may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN, or the like. This is not limited in the embodiments of this application.

Figure 1:
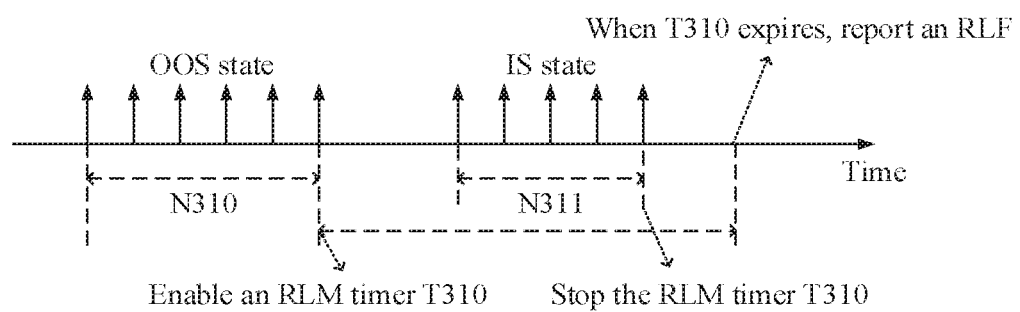
FIG. 1 is a schematic diagram of a process in which a terminal device performs RLM in a BWP according to an embodiment of this application.
Figure 2:
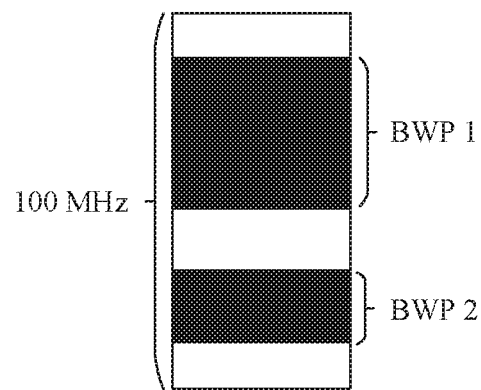
FIG. 2 is a schematic diagram of a BWP according to an embodiment of this application.

The following first briefly describes technical concepts in the embodiments of this application with reference to FIG. 1 and FIG. 2.

Radio Link Monitoring (RLM)

RLM is an important step in a wireless network. After accessing a network, a terminal device needs to perform RLM in a serving cell all the time to determine whether a current link can work normally. If it is found that the current link cannot work normally, the terminal device may attempt to perform random access to re-access the network.

Specifically, the terminal device may perform measurement by using a reference signal used for the RLM, and report an obtained measurement result to a higher layer of the terminal device. In addition, the RLM is based on an evaluation periodicity; in other words, the RLM is periodic. One evaluation periodicity may include at least one monitoring subframe, and adjacent monitoring subframes may be consecutive or nonconsecutive in time. In each evaluation periodicity, the terminal device performs measurement by using the reference signal used for the RLM, to obtain a bit error rate used to indicate radio link quality, and then compares the bit error rate with a preset threshold. If the bit error rate is greater than the preset threshold, the terminal device reports an out of synchronization (OOS) state to a higher layer of the terminal device until a quantity of consecutive OOS states that are reported by the terminal device meets a preset threshold, and enables an RLM timer. After the RLM timer is enabled, similarly, the terminal device continues to compare a subsequently obtained bit error rate with the preset threshold. If the bit error rate is less than the preset threshold, the terminal device reports an in synchronization (IS) state to the higher layer of the terminal device until a quantity of consecutively reported IS states meets a preset threshold. In this case, if the RLM timer does not expire, the RLM timer is stopped, and it indicates that current radio link quality can meet a wireless communication requirement; or if the RLM timer expires, it indicates that current radio link quality is relatively poor, and may not meet a wireless communication requirement. As a result, the terminal device reports a radio link failure (RLF) event to the higher layer of the terminal device.

The bit error rate in the embodiments of this application is a bit error rate of a downlink control channel.

It can be learned from the foregoing descriptions that, the RLM timer is enabled after a process of reporting the OOS state is completed, and after the RLM timer is enabled, the IS state is reported. Therefore, the RLM may be understood as two phases: a phase of reporting the OOS state and a phase of reporting the IS state. Before the RLM timer is enabled, the terminal device is in the phase of reporting the OOS state. In the phase of reporting the OOS state, the terminal device reports only the OOS state. When comparing the bit error rate with the preset threshold, the terminal device does not report the IS state even if the bit error rate is less than the preset threshold, and continues to perform RLM in a next evaluation periodicity, until a quantity of consecutively reported OOS states meets the preset threshold. Similarly, after the RLM timer is enabled, the terminal device is in the phase of reporting the IS state. In the phase of reporting the IS state, the terminal device reports only the IS state. When comparing the bit error rate with the preset threshold, the terminal device does not report the OOS state even if the bit error rate is greater than the preset threshold, and continues to perform RLM in a next evaluation periodicity, until a quantity of consecutively reported IS states meets the preset threshold or the RLM timer expires.

Herein, the consecutive OOS states and the consecutive IS states in the embodiments of this application are further explained and described.

Consecutive OOS States

The consecutive OOS states may be understood as that the terminal device reports the OOS state in each of consecutive evaluation periodicities; in other words, a bit error rate obtained by the terminal device in each of the consecutive evaluation periodicities is greater than the preset threshold. Conversely, if a bit error rate in one of the consecutive evaluation periodicities is less than the preset threshold, the terminal device re-counts a quantity of OOS states.

For example, it is assumed that in five consecutive evaluation periodicities, timing is started from the first evaluation periodicity; a bit error rate obtained in the first evaluation periodicity is greater than the preset threshold, the OOS state is reported, and a count is 1; OOS states are reported in the second evaluation periodicity and the third evaluation periodicity, and a total count is 3; a bit error rate obtained in the fourth evaluation periodicity is less than the preset threshold, and no OOS state is reported, so that counting is restarted from 0 in the fifth evaluation periodicity. Herein, the OOS states reported in the first three consecutive evaluation periodicities may be referred to as consecutive OOS states.

Consecutive IS States

Similar to the understanding of the consecutive OOS states, the consecutive IS states may be understood as that the IS state is reported in each of consecutive evaluation periodicities; in other words, a bit error rate obtained in each of the consecutive evaluation periodicities is less than the preset threshold. Conversely, if a bit error rate in one of the consecutive evaluation periodicities is greater than the preset threshold, the terminal device re-counts a quantity of IS states.

For example, it is assumed that in five consecutive evaluation periodicities, timing is started from the first evaluation periodicity; a bit error rate obtained in the first evaluation periodicity is less than the preset threshold, the IS state is reported, and a count is 1; IS states are reported in the second evaluation periodicity and the third evaluation periodicity, and a total count is 3; a bit error rate obtained in the fourth evaluation periodicity is greater than the preset threshold, and no IS state is reported, so that counting is restarted from 0 in the fifth evaluation periodicity. Herein, the IS states reported in the first three consecutive evaluation periodicities may be referred to as consecutive IS states.

It should be noted that, to count the quantity of reported OOS states or IS states, the terminal device may enable a counter to implement a counting function. Optionally, corresponding counters may be configured for the two different phases. For example, in the phase of reporting the OOS state, the terminal device may enable a counter N310, and in the phase of reporting the IS state, the terminal device may enable a counter N311.

In the embodiments of this application, the reference signal used for the RLM may be a synchronization signal block, a channel state information reference signal (CSI-RS), or the like. This is not limited herein.

FIG. 1 is a schematic diagram of a process in which a terminal device performs RLM in a BWP. As shown in FIG. 1, during the RLM, when the terminal device reports N310 consecutive OOS states, the terminal device enables an RLM timer T310, and then reports an IS state. If before the timer T310 expires, a quantity of consecutively reported IS states reaches N311, the terminal device stops the RLM timer T310. If a quantity of consecutively reported IS states does not meet N311 when the timer T310 expires, an RLF is reported.

Bandwidth Part

In a 5G system, a bandwidth of a single carrier is very large. For example, a maximum bandwidth of a single carrier below 6 GHz may be 100 MHz, and a maximum bandwidth of a single carrier above 6 GHz may be 200 MHz. However, for terminal devices, capabilities of different terminal devices may be different, and maximum bandwidths that can be supported by the terminal devices are also different. Not all terminal devices can support the bandwidth of 100 MHz or 200 MHz.

To resolve this problem, a bandwidth part (BWP) mechanism is introduced to the 5G system. A BWP is a part of a system bandwidth, and one BWP includes several consecutive resource blocks (RB) in the system bandwidth. A network device may configure a plurality of BWPs for a terminal device, and activate at least one of the plurality of BWPs for the terminal device to use.

FIG. 2 is a schematic diagram of a BWP according to an embodiment of this application. As shown in FIG. 2, in a system bandwidth of 10 WMHz, a network device configures two BWPs: a BWP 1 and a BWP 2 for a terminal device.

In an application scenario, because a power or a service type of a transmitted service changes, the terminal device needs to switch a BWP, to be specific, switch from a BWP (for example, a BWP #A) in which communication and RLM are currently performed to a new BWP (for example, a BWP #B), to perform wireless communication and RLM in the BWP #B.

In the prior art, when the terminal device switches from the BWP #A to the BWP #B, the terminal device continues to use a measurement result (for example, a measurement result #A) obtained by performing RLM in the BWP #A. For example, when the terminal device switches from the BWP #A to the BWP #B in a process of reporting an OOS state, and a quantity of consecutive OOS states included in the measurement result is 30, in a process of performing RLM in the BWP #B, a quantity of consecutively reported OOS states continues to be counted starting from 30.

However, in this case, because the counted quantity of consecutively reported OOS states includes the measurement result obtained by performing RLM in the BWP #A, and the measurement result cannot accurately reflect a radio link status in the BWP #B, accuracy of the RLM performed by the terminal device in the BWP #B is reduced, and communication quality is affected.

Based on this, the embodiments of this application provide a radio link monitoring method, to effectively improve accuracy of RLM performed by a terminal device after switching a BWP, thereby improving communication quality.

The radio link monitoring method in the embodiments of this application is described below in detail with reference to FIG. 3 to FIG. 17.

Figure 3:
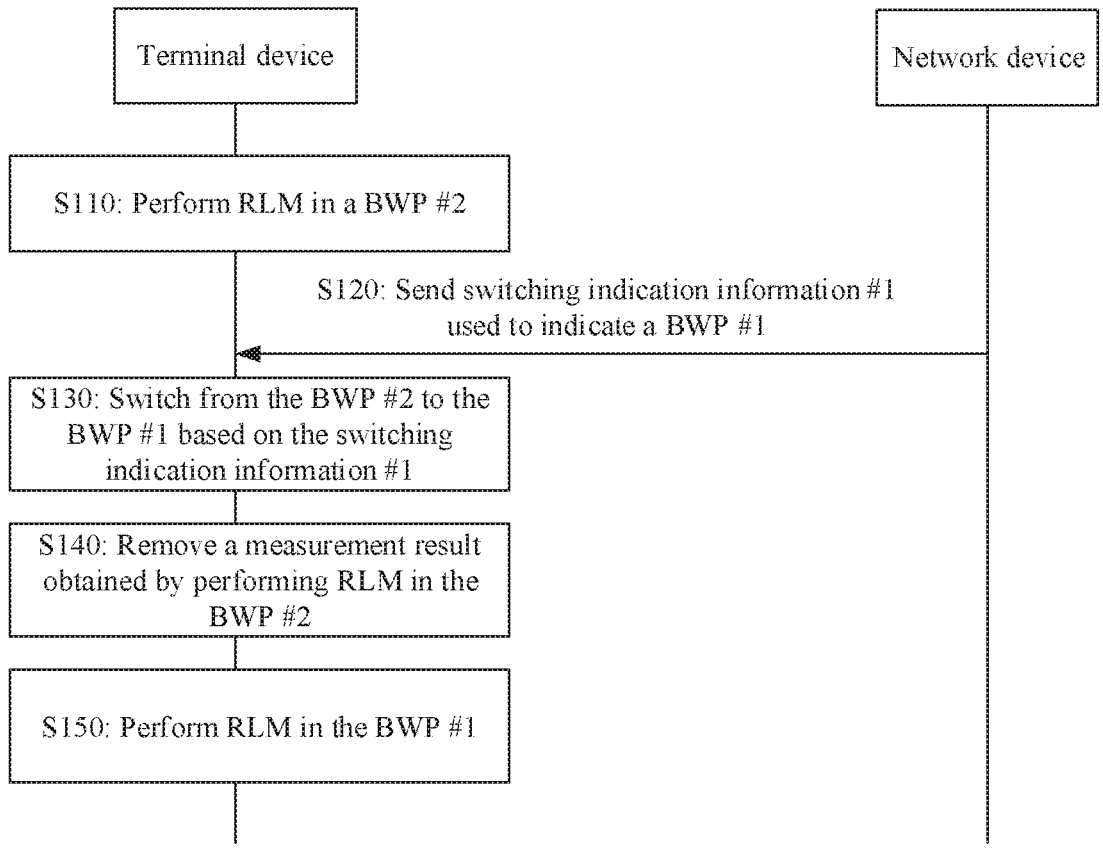
FIG. 3 is a schematic interaction diagram of a radio link monitoring method according to an embodiment of this application.

FIG. 3 is a schematic interaction diagram of a radio link monitoring method 100 according to an embodiment of this application. Each step of the method 100 is described in detail below.

In step S110, a terminal device performs radio link monitoring RLM in a bandwidth part BWP #2 (where the BWP #2 is an example of a second BWP).

For a manner in which the terminal device performs RLM in the BWP #2, refer to the foregoing description of the RLM.

In step S120, a network device sends switching information #1 (where the switching information #1 is an example of first switching information), where the switching information #1 is used to indicate that an active bandwidth part BWP includes a BWP #1 (where the BWP #1 is an example of a first BWP).

In other words, when the terminal device needs to switch the BWP based on an actual requirement, the network device may notify, by using the switching information #1, the terminal device of a BWP (for example, the BWP #1) that can be switched to; or the network device may indicate, by using the switching information #1, the terminal device to switch from the BWP #2 in which the RLM is currently performed to the BWP #1.

Further, in step S130, the terminal device switches from the second BWP to the first BWP based on the first switching information.

In step S140, the terminal device removes a measurement result obtained by performing RLM in the BWP #2, where the measurement result includes a quantity N1 of at least some out of synchronization OOS states or a quantity N2 of at least some in synchronization IS states.

In other words, the terminal device removes the measurement result in the BWP (namely, the BWP #2) in which the RLM is previously performed.

In a possible implementation, the terminal device may reset a counter, to be specific, the counter no longer continues to count a quantity of OOS states or a quantity of IS states based on the measurement result.

The quantity N1 of at least some out of synchronization OOS states indicates a quantity of all or some of consecutive OOS states that are counted by performing RLM in the BWP #2. Similarly, the quantity N2 of at least some synchronized IS states indicates a quantity of all or some of consecutive IS states that are counted by performing RLM in the BWP #2.

In other words, the measurement result may be all or some of measurement results obtained by the terminal device by performing RLM in the BWP #2.

If the measurement result includes the quantity N1 of OOS states, N1 may be a quantity of all or some of the consecutive OOS states that are counted, when the terminal device switches to the BWP #1, by performing RLM in the BWP #2.

If the measurement result includes the quantity N2 of IS states, N2 may be a quantity of all or some of the consecutive IS states that are counted, when the terminal device switches to the BWP #1, by performing RLM in the BWP #2.

In step S150, the terminal device performs RLM in the BWP #1.

The following separately describes, from two phases in which the terminal device reports or counts the measurement result, a specific manner in which the terminal device removes the measurement result.

First phase: Before an RLM timer is enabled (a phase of reporting the OOS state)

The terminal device re-counts, starting from P1, a quantity of consecutive OOS states, where the measurement result includes the quantity N1 of at least some OOS states, P1=Q1−N1, Q1 is the quantity of consecutive OOS states that is counted by the terminal device by performing RLM in the BWP #2, and N1 is less than or equal to Q1.

Q1 may be the quantity of all the consecutive OOS states that are counted by the terminal device by performing RLM in the BWP #2.

Figure 4:
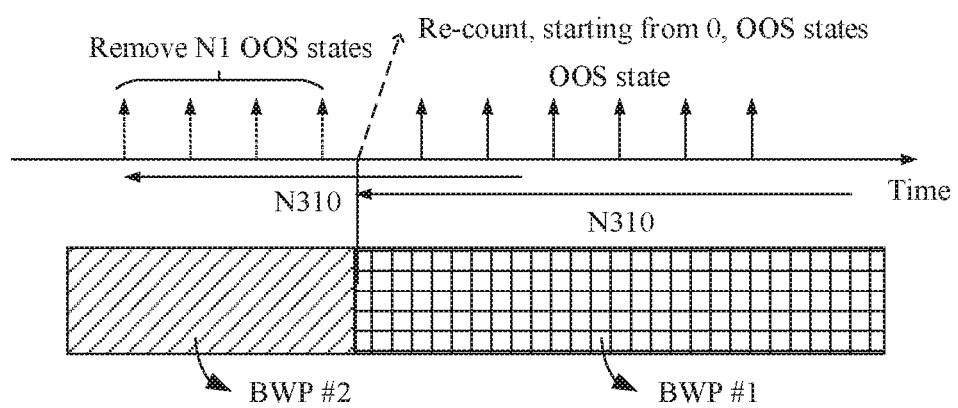
FIG. 4 to FIG. 7 are schematic diagrams of a process in which a terminal device performs RLM in a BWP according to an embodiment of this application.

As shown in FIG. 4, if the measurement result includes the quantity of all the consecutive OOS states that are counted by the terminal device by performing RLM in the BWP #2, N1=Q1 and P1=0. In this case, the terminal device removes the Q OOS states, and re-counts, starting from 0, a quantity of consecutive OOS states.

In a possible implementation, the counter may be set to zero, so that the terminal device re-counts, starting from 0 by using the counter, the quantity of OOS states that are reported by performing RLM in the BWP #1.

Figure 5:
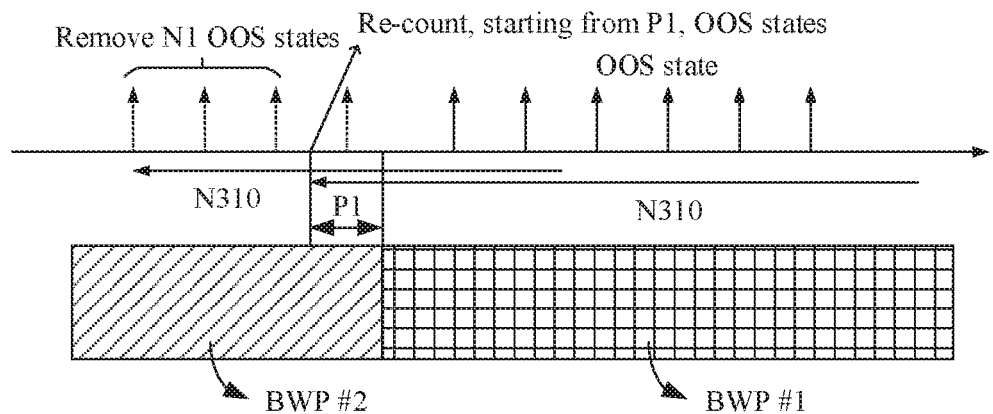

As shown in FIG. 5, if the measurement result includes the quantity of some consecutive OOS states that are counted by the terminal device by performing RLM in the BWP #2, N1 is less than Q. In this case, the terminal device removes the N1 consecutive OOS states from the Q1 consecutive OOS states, and re-counts, starting from P1, a quantity of consecutive OOS states.

In a possible implementation, the counter may be reset to enable a value of the reset counter to be P1, so that the terminal device can re-count, starting from P by using the counter, the quantity of OOS states that are reported by performing RLM in the BWP #1.

In a process in which the terminal device re-counts, starting from P1, the quantity of consecutive OOS states, in the first evaluation periodicity during the RLM performed in the BWP #1, if an obtained bit error rate is greater than a preset threshold, 1 is added to P1; or if an obtained bit error rate is less than the preset threshold, no OOS state is reported. Because the reported OOS is already not consecutive, a quantity of consecutive OOS states is re-counted starting from 0 in the second evaluation periodicity.

For example, if Q1=50 and N1=30, the terminal device re-counts, starting from P1=20, a quantity of consecutive OOS states.

In the first evaluation periodicity during the RLM performed in the BWP #1, if an obtained bit error rate is greater than the preset threshold, the quantity of consecutive OOS states that are re-counted is 21, or if an obtained bit error rate is less than the preset threshold, no OOS state is reported, so that a quantity of consecutive OOS states is re-counted starting from 0 in the second evaluation periodicity.

Second phase: After the RLM timer is enabled (a phase of reporting the IS state)

The terminal device re-counts, starting from P2, a quantity of consecutive IS states, where the measurement result includes the quantity N2 of at least some IS states. P2=Q2−N2, Q2 is the quantity of consecutive IS states that is counted by the terminal device by performing RLM in the second BWP, and N2 is less than or equal to Q2.

Q2 may be the quantity of all the consecutive IS states that are counted by the terminal device by performing RLM in the BWP #2.

Figure 6:
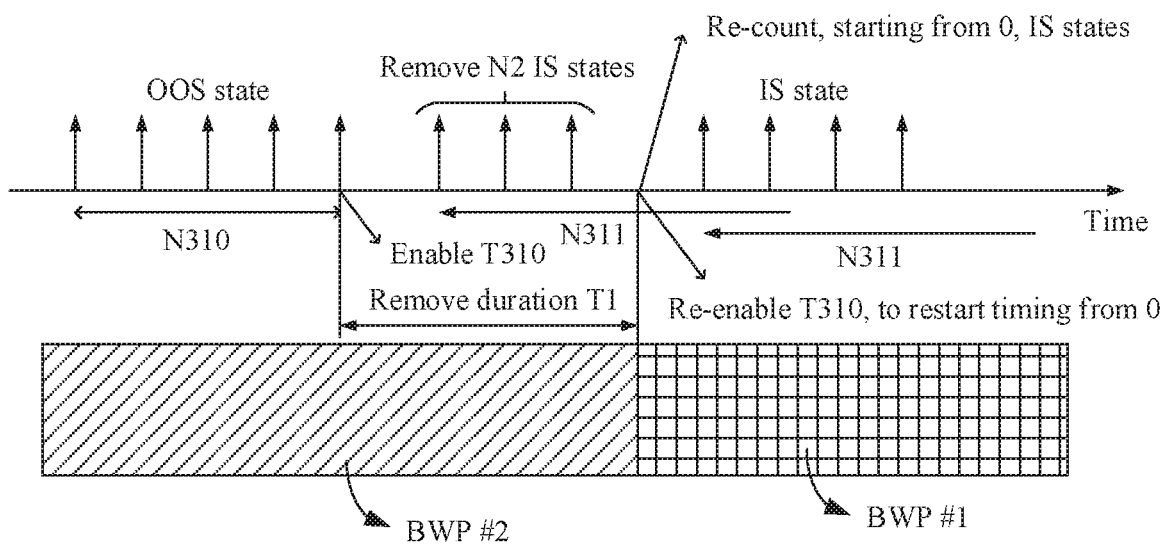

As shown in FIG. 6, if the measurement result includes the quantity of all the consecutive IS states that are counted by the terminal device by performing RLM in the BWP #2, N2=Q2 and P2=0. In this case, the terminal device removes the Q2 IS states, and re-counts, starting from 0, a quantity of consecutive IS states.

In a possible implementation, the counter may be set to zero, so that the terminal device re-counts, starting from 0 by using the counter, the quantity of IS states that are reported by performing RLM in the BWP #1.

Figure 7:
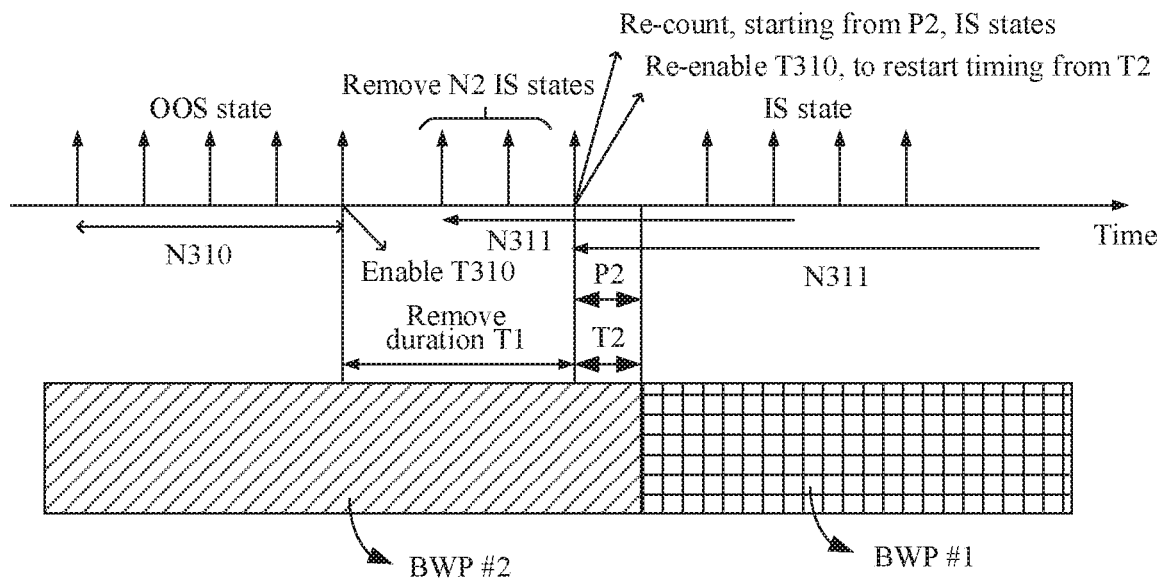

As shown in FIG. 7, if the measurement result includes the quantity of some consecutive IS states that are counted by the terminal device by performing RLM in the BWP #2, N2 is less than Q2. In this case, the terminal device removes the N2 consecutive OOS states from the Q2 consecutive OOS states, and re-counts, starting from P2, a quantity of consecutive OOS states.

In a possible implementation, the counter may be reset to enable a value of the reset counter to be P2, so that the terminal device can re-count, starting from P2 by using the counter, the quantity of IS states that are reported by performing RLM in the BWP #1.

For a manner in which the terminal device counts the consecutive IS states in the second phase, refer to the manner in which the terminal device counts the consecutive OOS states in the first phase in the foregoing method 100. For brevity, details are not described herein again.

In this embodiment of this application, in the phase of reporting the IS state, related processing may further be performed on duration of the RLM timer.

Optionally, the measurement result further includes at least partial duration T1 of total duration recorded from a time at which the RLM timer is enabled to a time at which the RLM timer is stopped; and the removing, by the terminal device, a measurement result obtained by performing RLM in the BWP #2 includes:

restarting, by the terminal device, timing from T2, where T2=T−T1, T is the total duration recorded from the time at which the RLM timer is enabled to the time at which the RLM timer is stopped, and T1 is less than or equal to T.

Still as shown in FIG. 6, if the measurement result includes the total duration recorded from the time at which the RLM timer is enabled to the time at which the RLM timer is stopped, T1=T and T2=0. In this case, the terminal device restarts timing from 0.

In a specific implementation, the RLM timer may be re-enabled, and the timer is set to zero, so that the terminal device restarts timing from 0 by using the RLM timer.

Still as shown in FIG. 7, if the measurement result includes the partial duration of the total duration recorded from the time at which the RLM timer is enabled to the time at which the RLM timer is stopped. T1 is less than T. In this case, the terminal device restarts timing from T2.

In a specific implementation, the RLM timer may be re-enabled to enable a value of the re-enabled RLM timer to be T2, so that the terminal device restarts timing from T2 by using the RLM timer.

Therefore, according to the radio link monitoring method provided in this embodiment of this application, after switching from the second BWP in which the RLM is currently performed to the first BWP, the terminal device removes the measurement result obtained by performing RLM in the second BWP, where the measurement result is all or some of the measurement results obtained by performing RLM in the second BWP, so that the terminal device does not use the measurement result in a process of performing RLM in the first BWP, to avoid a problem in the prior art that accuracy of the RLM is relatively low because all the measurement results are used in the process of performing RLM in the first BWP, thereby effectively improving accuracy of the RLM performed by the terminal device in the first BWP that is switched to, and further improving communication quality.

Optionally, the BWP #1 and the BWP #2 do not overlap at all.

To be specific, when the BWP #1 and the BWP #2 do not overlap at all, the terminal device determines whether all or some of the measurement results obtained by performing RLM in the BWP #2 can be used, and performs RLM in the BWP #1 after removing the measurement result.

By way of example, and not limitation, the network device may alternatively notify, by using signaling, the terminal device whether the measurement result can be removed.

Optionally, the method further includes:

receiving, by the terminal device, indication information sent by the network device, where the indication information is used to indicate the terminal device to remove the measurement result in the process of performing RLM in the BWP #1.

In this embodiment of this application, the terminal device may remove the measurement result obtained by performing RLM in the BWP #2, or continue to use the measurement result obtained by performing RLM in the BWP #2.

That the terminal device removes the measurement result obtained by performing RLM in the BWP #2 is described above. A method in which the terminal device continues to use the measurement result is described below in detail by using a method 200 and a method 300.

Figure 8:
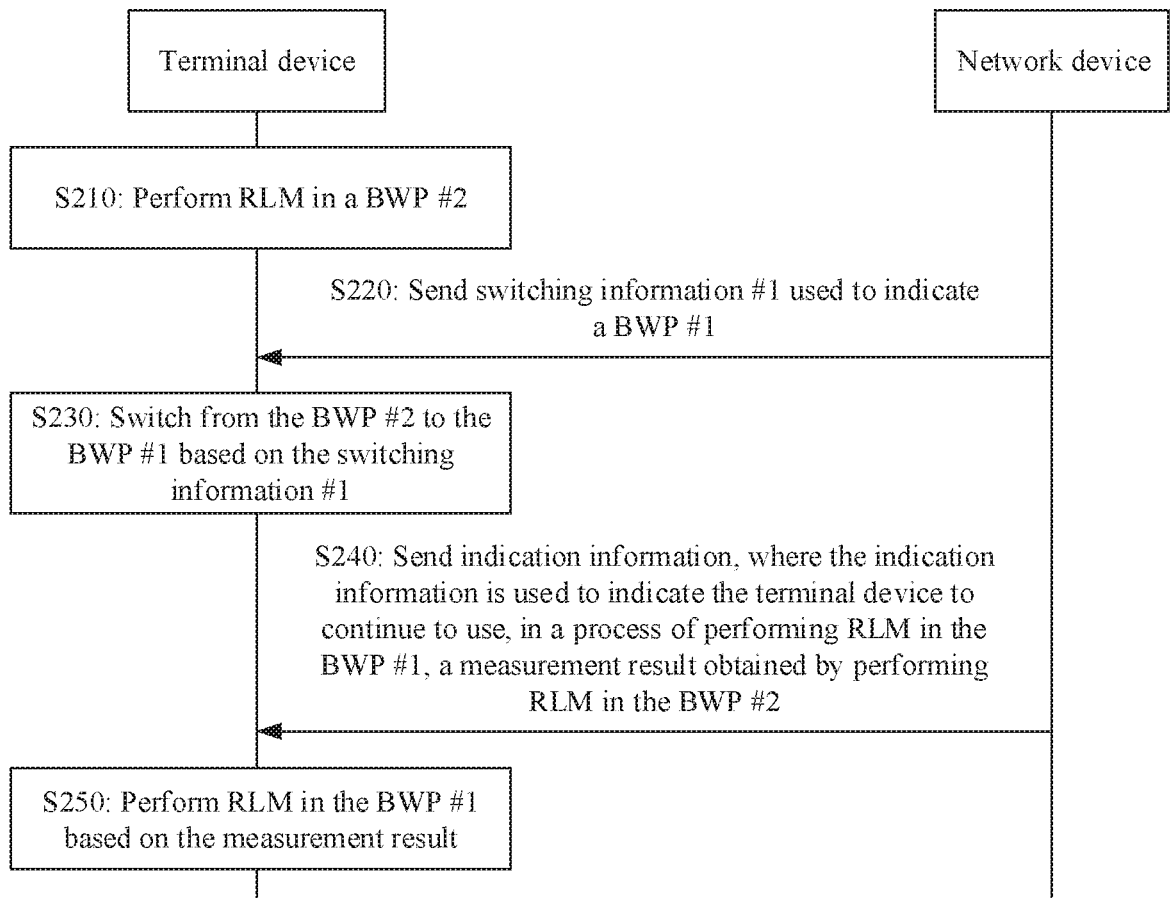
FIG. 8 is a schematic interaction diagram of a radio link monitoring method according to another embodiment of this application.

FIG. 8 is a schematic interaction diagram of the radio link monitoring method 200 according to an embodiment of this application. Each step of the method 200 is described in detail below.

In step S210, a terminal device performs radio link monitoring RLM in a BWP #2.

For descriptions of step S210, refer to the foregoing descriptions of the RLM.

In step S220, a network device sends switching information #1 (where the switching information #1 is an example of first switching information), where the switching information #1 is used to indicate that an active bandwidth part BWP includes a BWP #1 (where the BWP #1 is an example of a first BWP).

For descriptions of step S220, refer to the descriptions of step S120 in the foregoing method 100.

In step S230, the terminal device switches from the BWP #2 to the BWP #1 based on the switching information #1.

In step S240, the network device sends indication information, where the indication information is used to indicate the terminal device to continue to use, in a process of performing RLM in the BWP #1, a measurement result obtained by performing RLM in the BWP #2; and the measurement result includes a quantity N1 of at least some out of synchronization OOS states or a quantity N2 of at least some in synchronization IS states.

The measurement result may be all or some of measurement results obtained by the terminal device by performing RLM in the BWP #2.

If the measurement result includes the quantity N1 of OOS states, N1 may be a quantity of all or some of consecutive OOS states that are counted, when the terminal device switches to the BWP #1, by performing RLM in the BWP #2.

If the measurement result includes the quantity N2 of IS states. N2 may be a quantity of all or some of consecutive IS states that are counted, when the terminal device switches to the BWP #1, by performing RLM in the BWP #2.

In step S250, the terminal device performs RLM in the BWP #1 based on the measurement result.

In other words, the terminal device continues to use the measurement result obtained by performing RLM in the BWP #2, to perform RLM in the BWP #1. The following separately describes, from two phases in which the terminal device reports or counts the measurement result, a specific manner in which the terminal device continues to use the measurement result.

First phase: Before an RLM timer is enabled (a phase of reporting the OOS state)

The terminal device continues to count, starting from N, a quantity of consecutive OOS states, where the measurement result includes the quantity N1 of at least some OOS states.

Figure 9:
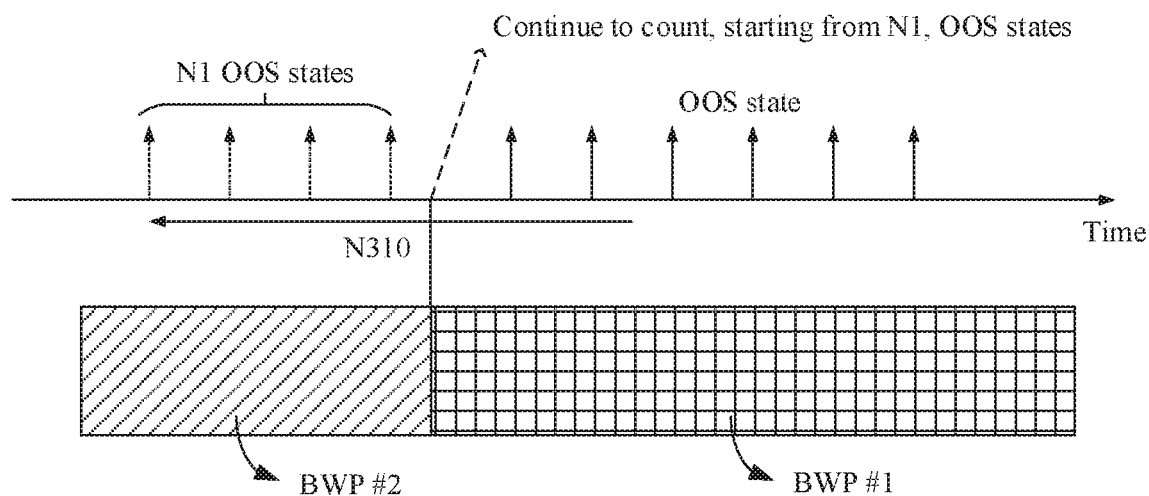
FIG. 9 to FIG. 12 are schematic diagrams of a process in which a terminal device performs RLM in a BWP according to another embodiment of this application.

As shown in FIG. 9, N1 is the quantity of all the consecutive OOS states that are counted by the terminal device by performing RLM in the BWP #2, and a quantity of OOS states that are counted or reported by the terminal device by performing RLM in the BWP #1 includes the quantity N1 of all the consecutive OOS states that are counted by the terminal device by performing RLM in the BWP #2.

In a possible implementation, no processing is performed on a counter, so that the terminal device continues to count, starting from N1 by using the counter, the quantity of OOS states that are reported by performing RLM in the BWP #1.

Figure 10:
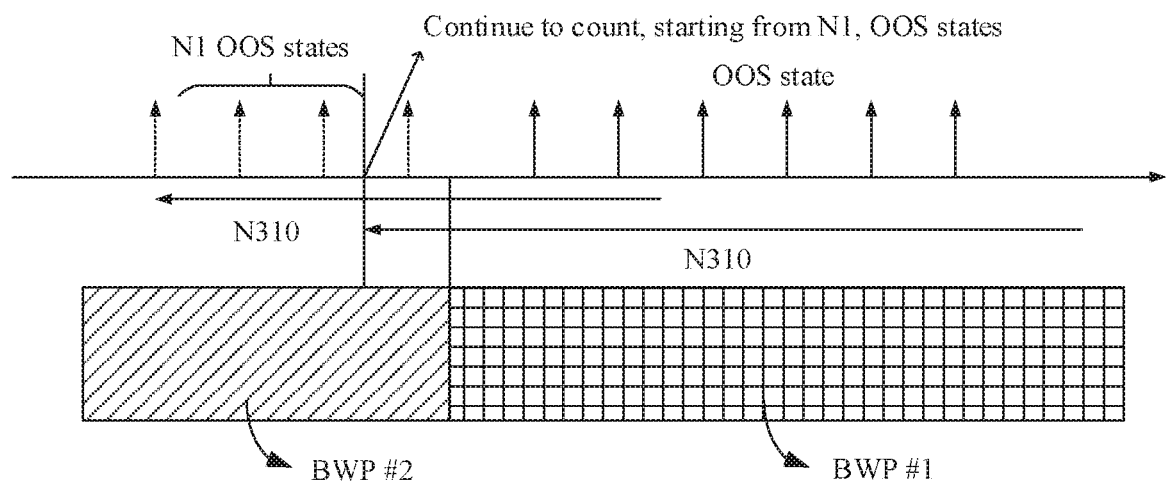

As shown in FIG. 10, N1 is the quantity of some consecutive OOS states that are counted by the terminal device by performing RLM in the BWP #2, and a quantity of OOS states that are counted or reported by the terminal device by performing RLM in the BWP #1 includes the quantity N1 of some consecutive OOS states that are counted by the terminal device by performing RLM in the BWP #2.

In a possible implementation, a counter may be reset to enable a value of the reset counter to be N1, so that the terminal device can continue to count, starting from N1 by using the counter, the quantity of OOS states that are reported by performing RLM in the BWP #1. In a process in which the terminal device continues to count, starting from N1, the quantity of consecutive OOS states, in the first evaluation periodicity during the RLM performed in the BWP #1, if an obtained bit error rate is greater than a preset threshold, 1 is added to N1; or if an obtained bit error rate is less than a preset threshold, no OOS state is reported. Because the reported OOS is already not consecutive, a quantity of consecutive OOS states is re-counted starting from 0 in the second evaluation periodicity.

For example, if N1=30, the terminal device continues to count, starting from N1=30, a quantity of consecutive OOS states. In the first evaluation periodicity during the RLM performed in the BWP #1, if an obtained bit error rate is greater than the preset threshold, the quantity of consecutive OOS states that are re-counted is 31; or if an obtained bit error rate is less than the preset threshold, no OOS state is reported, so that a quantity of consecutive OOS states is re-counted starting from 0 in the second evaluation periodicity.

Second phase: Before the RLM timer is enabled (a phase of reporting the IS state)

The terminal device continues to count, starting from N2, a quantity of consecutive IS states, where the measurement result includes the quantity N2 of at least some IS states.

Figure 11:
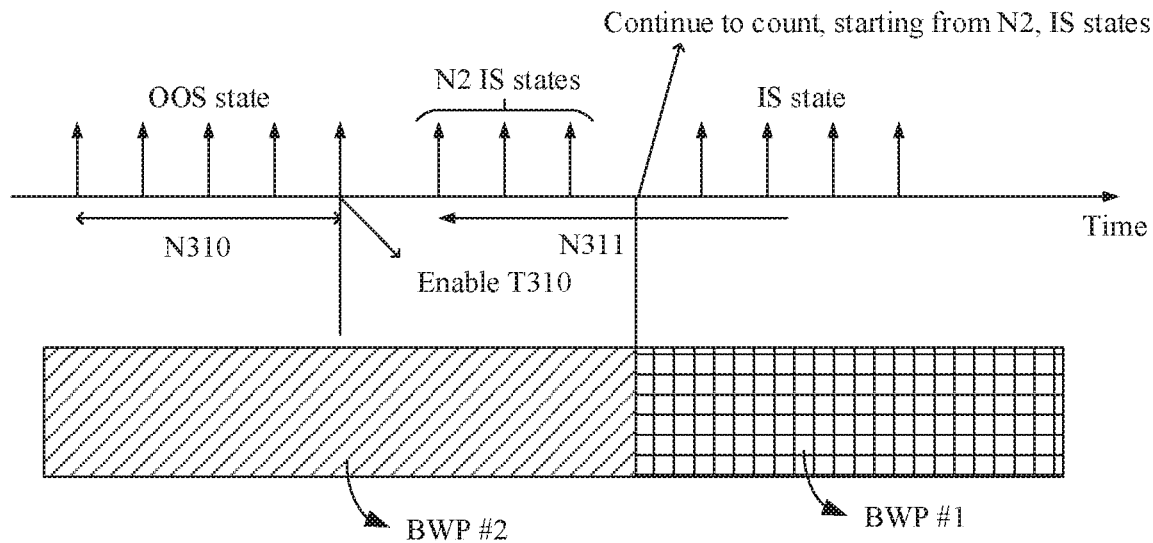

As shown in FIG. 11, N2 is the quantity of all the consecutive IS states that are counted by the terminal device by performing RLM in the BWP #2, a quantity of IS states that are counted or reported by the terminal device by performing RLM in the BWP #1 includes the quantity N2 of all the consecutive IS states that are counted by the terminal device by performing RLM in the BWP #2.

In a possible implementation, no processing is performed on the counter, so that the terminal device continues to count, starting from N2 by using the counter, the quantity of IS states that are reported by performing RLM in the BWP #1.

Figure 12:
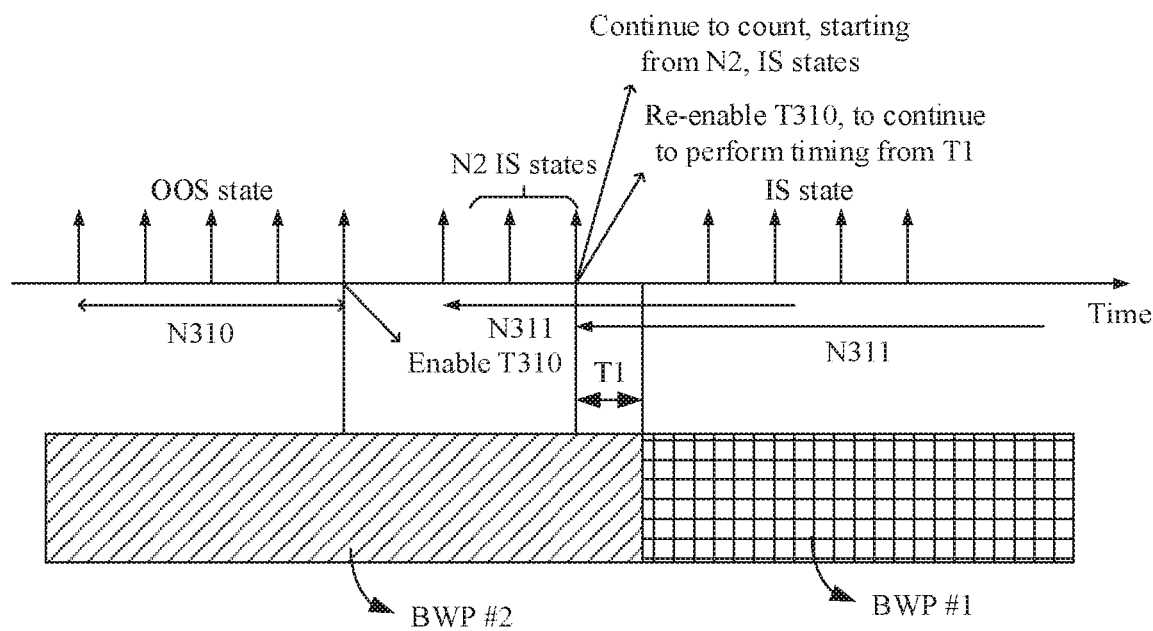

As shown in FIG. 12, N2 is the quantity of some consecutive IS states that are counted by the terminal device by performing RLM in the BWP #2, a quantity of IS states that are counted or reported by the terminal device by performing RLM in the BWP #1 includes the quantity N2 of some consecutive IS states that are counted by the terminal device by performing RLM in the BWP #2.

In a possible implementation, the counter may be reset to enable a value of the reset counter to be N2, so that the terminal device can continue to count, starting from N2 by using the counter, the quantity of IS states that are reported by performing RLM in the BWP #1.

For a manner in which the terminal device counts the consecutive IS states in the second phase, refer to the manner in which the terminal device counts the consecutive OOS states in the first phase in the foregoing method 200. For brevity, details are not described herein again.

Optionally, the measurement result further includes at least partial duration T1 of total duration recorded from a time at which the RLM timer is enabled to a time at which the RLM timer is stopped; and the performing, by the terminal device, RLM in the BWP #1 based on the measurement result includes:

continuing, by the terminal device, to perform timing from T1.

Still as shown in FIG. 11, T1 is the partial duration recorded from the time at which the RLM timer is enabled to the time at which the RLM timer is stopped, and the terminal device continues to perform timing from T1.

In a specific implementation, no processing is performed on the RLM timer, so that the terminal device continues to perform timing from T1 by using the RLM timer.

Still as shown in FIG. 12, T1 is the partial duration of the total duration recorded from the time at which the RLM timer is enabled to the time at which the RLM timer is stopped, and the terminal device continues to perform timing from T1.

In a specific implementation, the RLM timer may be re-enabled to enable a value of the re-enabled RLM timer to be T1, so that the terminal device restarts timing from T1 by using the RLM timer.

Therefore, according to the radio link monitoring method provided in this embodiment of this application, the network device sends, to the terminal device, the indication information used to indicate the terminal device to continue to use, in the process of performing RLM in the first BWP, the measurement result obtained by performing RLM in the second BWP, where the measurement result is all or some of the measurement results obtained by performing RLM in the second BWP, so that the terminal device may continue to use the measurement result in the process of performing RLM in the first BWP, thereby improving RLM efficiency.

Optionally, the BWP #1 and the BWP #2 partially overlap.

To be specific, when the BWP #1 and the BWP #2 partially overlap, the network device considers that the measurement result may be used in the process of performing RLM in the BWP #1, and this has little impact on accuracy of the RLM. Therefore, the indication information may be used to indicate the terminal device to continue to use the measurement result in the process of performing RLM in the BWP #1, thereby improving the RLM efficiency.

Figure 13:
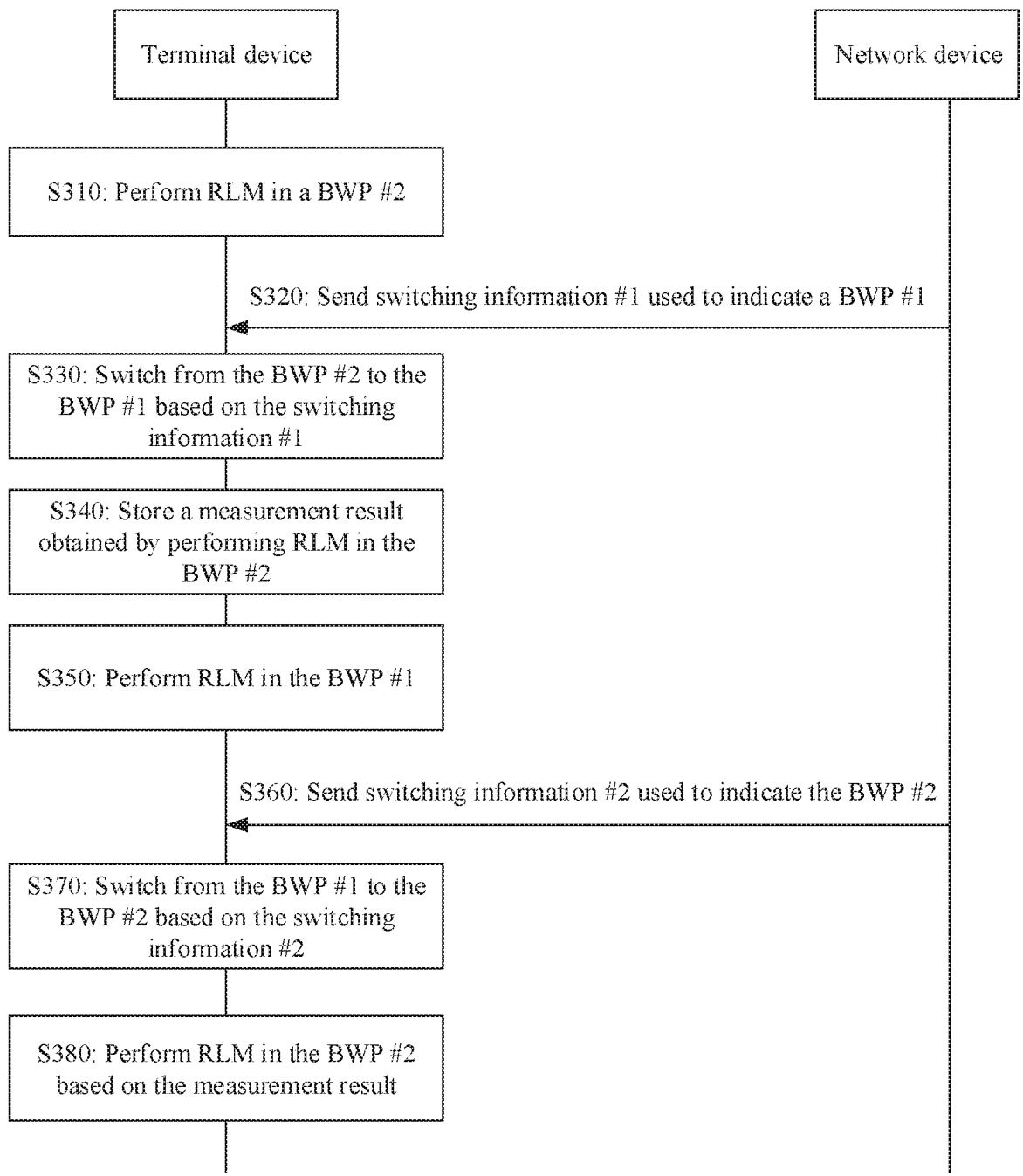
FIG. 13 is a schematic interaction diagram of a radio link monitoring method according to another embodiment of this application.

FIG. 13 is a schematic interaction diagram of the radio link monitoring method 300 according to an embodiment of this application. Each step of the method 300 is described in detail below.

In step S310, a terminal device performs radio link monitoring RLM in a bandwidth part BWP #2 (where the BWP #2 is an example of a second BWP).

For descriptions of step S310, refer to the foregoing descriptions of the RLM.

In step S320, the terminal device receives switching information #1 (where the switching information #1 is an example of first switching information) sent by a network device, where the switching information #1 is used to indicate that an active BWP includes a BWP #1 (where the BWP #1 is an example of a first BWP #1).

For descriptions of step S320, refer to the descriptions of step S120 in the foregoing method 100.

In step S330, the terminal device switches from the BWP #2 to the BWP #1 based on the switching information #1.

In step S340, the terminal device stores a measurement result obtained by performing RLM in the BWP #2, where the measurement result includes a quantity N1 of at least some out of synchronization OOS states or a quantity N2 of at least some in synchronization IS states.

In step S350, the terminal device performs RLM in the BWP #1.

In this embodiment of this application, when performing RLM in the BWP #1, the terminal device may perform, in a manner of the method 100, to be specific, by removing the measurement result obtained by performing RLM in the BWP #2, RLM in the BWP #1 based on the removed measurement result. For a specific implementation, refer to related descriptions of the method 100. For brevity, details are not described herein again.

Alternatively, when performing RLM in the BWP #1, the terminal device may perform RLM in the BWP #1 in a manner of the method 200, to be specific, by continuing to use the measurement result obtained by performing RLM in the BWP #2. For a specific implementation, refer to related descriptions of the method 200. For brevity, details are not described herein again.

It should be understood that sequence numbers of step S330, step S340, and step S350 do not mean execution sequences. The execution sequences of the steps should be determined based on functions and internal logic of the steps. For example, step S330 and step S340 may be simultaneously performed, or step S330 is performed before step S340, or step S340 and step S350 may be simultaneously performed.

In step S360, the terminal device receives switching information #2 (where the switching information #2 is an example of second switching information) sent by the network device, where the switching information #2 is used to indicate the BWP #2.

To be specific, the terminal device needs to be switched to a BWP (namely, the BWP #2) in which RLM has been performed before based on an actual requirement. The network device may notify, by using the switching information #2, the terminal device that the terminal device can be switched to the BWP #2.

Further, in step S370, the terminal device switches from the BWP #1 to the BWP #2 based on the switching information #2.

In step S380, the terminal device performs RLM in the BWP #2 based on the measurement result.

In other words, the terminal device may continue to perform RLM in the BWP #2 based on the previously stored measurement result obtained by performing RLM in the BWP #2; or the terminal device may continue to perform RLM in the BWP #2 by continuing to use the measurement result.

For a manner in which the terminal device performs RLM in the BWP #2 by continuing to use the measurement result, refer to the manner in which the terminal device continues to use the measurement result in the two phases of reporting or counting the measurement result in step S250 of the method 200. A unique difference is as follows: A measurement object in the method 300 is the BWP #2, and a measurement object in the method 200 is the BWP #1. Therefore, for brevity, details are not described herein again.

Optionally, if an interval between a time at which the terminal device switches from the BWP #2 to the BWP #1 and a time at which the terminal device switches from the BWP #1 to the BWP #2 is less than a preset threshold, the terminal device continues to perform RLM in the BWP #2 by continuing to use the measurement result.

Therefore, according to the radio link monitoring method provided in this application, after switching from the second BWP in which the RLM is currently performed to the first BWP, the terminal device may store the measurement result obtained by performing RLM in the second BWP, where the measurement result is all or some of measurement results obtained by performing RLM in the second BWP, so that after subsequently switching from the first BWP to the second BWP, the terminal device may continue to perform RLM in the second BWP by continuing to use the measurement result, thereby reducing implementation complexity.

How the terminal device performs RLM after switching the BWP in the embodiments of this application is described above in detail by using FIG. 3 to FIG. 13. A radio link monitoring method according to another embodiment of this application is described below in detail with reference to FIG. 14.

In a 5G system, it has become a trend that a terminal device may perform wireless communication by using a plurality of BWPs. Therefore, how to perform RLM in the plurality of BWPs is a problem that needs to be further discussed. Therefore, an embodiment of this application provides a radio link monitoring method, to effectively resolve the foregoing problem.

Figure 14:
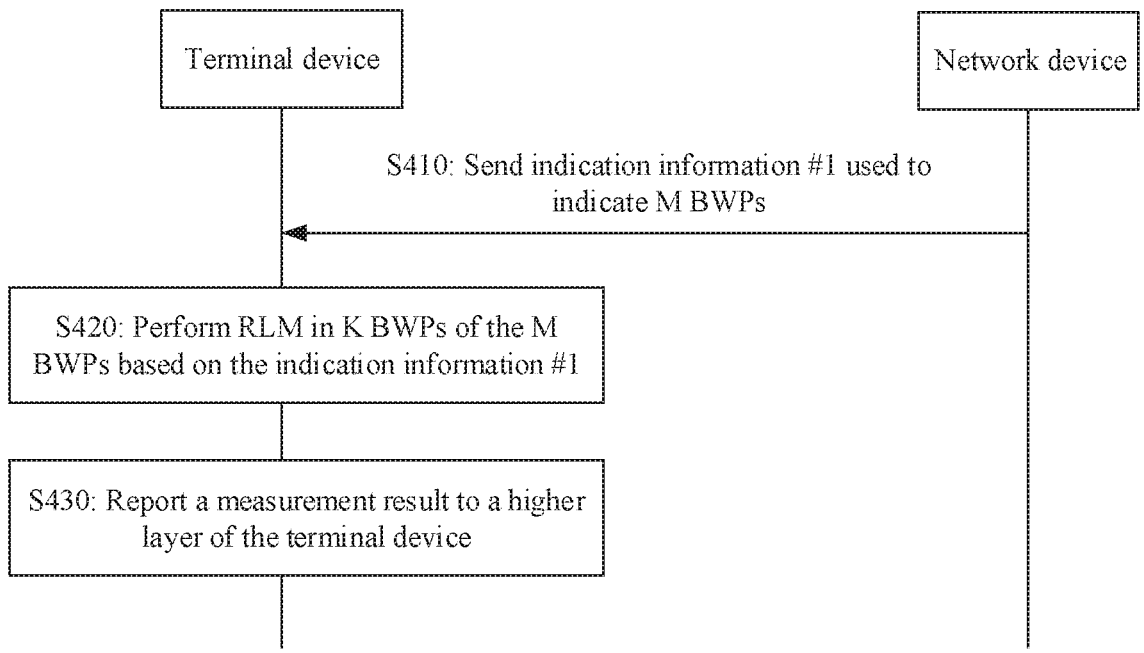
FIG. 14 is a schematic interaction diagram of a radio link monitoring method according to another embodiment of this application.

FIG. 14 is a schematic interaction diagram of a radio link monitoring method 400 according to an embodiment of this application. Each step of the method 400 is described in detail below.

In step S410, a network device sends indication information #1 (where the indication information #1 is an example of first indication information), where the indication information #1 is used to indicate that active bandwidth parts BWPs include M BWPs, and M is an integer greater than 1.

That is, the network device may indicate, by using signaling, a terminal device to perform communication in the M active BWPs.

In step S420, the terminal device performs RLM in K BWPs of the M BWPs based on the indication information #1, where K is an integer greater than 1, and K is less than or equal to M.

To be specific, although the terminal device may perform communication in the M BWPs, the terminal device performs RLM only in the K BWPs of the M BWPs based on a rule or a manner, where the K BWPs may be any K BWPs of the M BWPs.

Optionally, the K BWPs may be predefined in a system.

Optionally, the method further includes:

receiving, by the terminal device, indication information #2 (where the indication information #2 is an example of second indication information) sent by the network device, where the indication information #2 is used to indicate the K BWPs, and K is less than M; and the performing, by the terminal device, RLM in K BWPs of the M BWPs based on the indication information #1 includes:

performing, by the terminal device, RLM in the K BWPs of the M BWPs based on the indication information #1 and the indication information #2.

In other words, the terminal device may further determine the K BWPs based on the indication information #2, to perform RLM in the K BWPs.

In step S430, the terminal device reports a measurement result to a higher layer of the terminal device, where the measurement result includes an out of synchronization OOS state or an in synchronization IS state.

In other words, the terminal device feeds back, to the higher layer of the terminal device, the measurement result that is for the M BWPs and that is obtained by performing RLM in the K BWPs.

It should be noted that, although the measurement result of the RLM performed in the K BWPs is obtained, the measurement result of the K BWPs represents a measurement result obtained by performing RLM in the M BWPs.

Therefore, according to the radio link monitoring method provided in this embodiment of this application, when the terminal device can perform wireless communication by using the M BWPs, the terminal device can determine a radio link status of the terminal device by performing RLM in the K BWPs of the M BWPs, thereby effectively reducing complexity of the RLM.

For how to report the measurement result in a process of performing RLM in the K BWPs of the M BWPs in step S420, this embodiment of this application provides two manners (namely, a manner 1 and a manner 2). The following separately describes in detail the two manners.

Manner 1

Measurement values obtained by performing RLM in the K BWPs are averaged, to report the generated measurement result.

The following separately describes in detail, from two phases in which the terminal device reports the measurement result, a process of how the terminal device reports the measurement result.

First phase: Before an RLM timer is enabled (a phase of reporting the OOS state)

Optionally, the reporting, by the terminal device, a measurement result to a higher layer of the terminal device includes:

averaging, by the terminal device, K measurement values that are obtained by performing RLM in the K BWPs in a first time period, to obtain a first average measurement value, where the K BWPs correspond one-to-one to the K measurement values; and if a bit error rate obtained based on the first average measurement value is greater than a preset threshold, reporting, by the terminal device, the OOS state.

The measurement value may be a value, such as a power or a signal-to-noise ratio, that can represent the measurement result to some extent. The first time period may be any evaluation periodicity of the RLM.

Specifically, in the first time period, the terminal device performs RLM in each of the K BWPs, to obtain a measurement value for each BWP. In other words, the K measurement values in total are generated for the K BWPs. The K measurement values are averaged to obtain the first average measurement value. Further, the bit error rate corresponding to the first average measurement value is obtained by using a mapping relationship between a measurement value and a bit error rate. Finally, the bit error rate is compared with the preset threshold. If the bit error rate is greater than the preset threshold, the terminal device reports the OOS state; or if the bit error rate is less than the preset threshold, the terminal device does not report the OOS state, and continues to perform RLM in a next time period or evaluation periodicity.

For example, it is assumed that: M=3, where the M BWPs are respectively a BWP #A, a BWP #B, and a BWP #C; K=2, where two BWPs in which RLM is performed are respectively the BWP #A and the BWP #B; duration of one evaluation periodicity is 100 ms; the measurement value is a power value; and the preset threshold is 0.1.

A power value obtained by the terminal device by performing RLM in the BWP #A within 100 ms is 0 dB, and a power value obtained by performing RLM in the BWP #B within 100 ms is -2 dB. The first average power value obtained by averaging the two power values is -1 dB. The bit error rate obtained based on the first average power value is 0.2, because the bit error rate is greater than the preset threshold, an OOS state is generated, and the OOS state is reported to the higher layer of the terminal device.

For another example, M=K=3, where three BWPs in which RLM is performed are respectively a BWP #A, a BWP #B, and a BWP #C; duration of one evaluation periodicity is 100 ms; the measurement value is a power value; and the preset threshold is 0.05.

Power values obtained by the terminal device by performing RLM in the BWP #A, the BWP #B, and the BWP #C within 100 ms are respectively 0 dB, 1 dB, and 0 dB. The first average power value obtained by averaging the three power values is 0.33 dB. The bit error rate obtained based on the first average power value is 0.1, because the bit error rate is greater than the preset threshold, an OOS state is generated, and the OOS state is reported to the higher layer of the terminal device.

Second phase: After the RLM timer is enabled (a phase of reporting the IS state)

Optionally, the reporting, by the terminal device, a measurement result to a higher layer of the terminal device includes:

averaging, by the terminal device, K measurement values that are obtained by performing RLM in the K BWPs in a second time period, to obtain a second average measurement value, where the K BWPs correspond one-to-one to the K measurement values; and if a bit error rate obtained based on the second average measurement value is less than the preset threshold, reporting, by the terminal device, the IS state.

Similarly, the measurement value may be a value, such as a power or a signal-to-noise ratio, that can represent the measurement result to some extent. The second time period may be any evaluation periodicity of the RLM.

Specifically, in the second time period, the terminal device performs RLM in each of the K BWPs, to obtain a measurement value for each BWP. In other words, the K measurement values in total are generated for the K BWPs. The K measurement values are averaged to obtain the second average measurement value. Further, the bit error rate corresponding to the second average measurement value is obtained by using a mapping relationship between a measurement value and a bit error rate. Finally, the bit error rate is compared with the preset threshold. If the bit error rate is less than the preset threshold, the terminal device reports the IS state; or if the bit error rate is greater than the preset threshold, the terminal device does not report the IS state, and continues to perform RLM in a next time period or evaluation periodicity.

For example, it is assumed that: M=3, where the M BWPs are respectively a BWP #A, a BWP #B, and a BWP #C; K=2, where two BWPs in which RLM is performed are respectively the BWP #A and the BWP #B; duration of one evaluation periodicity is 100 ms; the measurement value is a power value; and the preset threshold is 0.01.

A power value obtained by the terminal device by performing RLM in the BWP #A within 100 ms is 2 dB, and a power value obtained by performing RLM in the BWP #B within 100 ms is 4 dB. The first average power value obtained by averaging the two power values is 3 dB. The bit error rate obtained based on the first average power value is 0.005, because the bit error rate is less than the preset threshold, an IS generated, and the IS state is reported to the higher layer of the terminal device.

For another example, M=K=3, where three BWPs in which RLM is performed are respectively a BWP #A, a BWP #B, and a BWP #C; duration of one evaluation periodicity is 100 ms; the measurement value is a power value; and the preset threshold is 0.05.

Power values obtained by the terminal device by performing RLM in the BWP #A, the BWP #B, and the BWP #C within 100 ms are respectively 2 dB, 2 dB, and 3.5 dB. The first average power value obtained by averaging the three power values is 2.5 dB. The bit error rate obtained based on the first average power value is 0.01, because the bit error rate is less than the preset threshold, an IS state is generated, and the IS state is reported to the higher layer of the terminal device.

Manner 2

K bit error rates obtained by performing RLM in the K BWPs are compared with a preset threshold, to report the generated measurement result.

First phase: Before an RLM timer is enabled (a phase of reporting the OOS state)

The reporting, by the terminal device, a measurement result to a higher layer of the terminal device includes:

performing, by the terminal device, RLM in the K BWPs in a third time period, to obtain the K bit error rates that correspond one-to-one to the K BWPs; and if L1 bit error rates of the K bit error rates are all greater than the preset threshold, reporting, by the terminal device, the OOS state, where L1 is an integer greater than or equal to 1, and L1 is less than or equal to K.

Specifically, the terminal device performs RLM in each of the K BWPs in the third time period, to obtain a measurement value for each BWP. In other words, K measurement values in total are generated for the K BWPs. Further, the bit error rate corresponding to each measurement value is obtained by using a predefined mapping relationship between a measurement value and a bit error rate, that is, the K bit error rates are obtained. Each of the K bit error rates is compared with the preset threshold. If the L1 bit error rates of the K bit error rates are all greater than the preset threshold, an OOS state is generated, and the OOS state is reported to the higher layer of the terminal device; otherwise, no OOS state is reported, and the RLM continues to be performed in a next period or evaluation periodicity.

For example, it is assumed that: M=5, where the M BWPs are respectively a BWP #A, a BWP #B, a BWP #C, a BWP #D, and a BWP #E; K=4, where BWPs in which RLM is performed are the BWP #A, the BWP #B, the BWP #C, and the BWP #D; duration of one evaluation periodicity is 100 ms; the measurement value is a power value; and the preset threshold is 0.1.

If L1=3, power values obtained by the terminal device by performing RLM in the four BWPs within 100 ms are respectively 0 dB, −1 dB, −1 dB, and −2 dB, and corresponding bit error rates are respectively 0.1, 0.2, 0.2, and 0.3. Because three of the four bit error rates are all greater than the preset threshold, an OOS state is generated, and the OOS state is reported to the higher layer of the terminal device.

If L1=4, the foregoing example in which only three of the four bit error rates are greater than the preset threshold continues to be used. If the condition L1=4 is not met, no OOS state is generated, and no OOS state is reported to the higher layer of the terminal device.

Second phase: Before the RLM timer is enabled (a phase of reporting the OOS state)

The reporting, by the terminal device, a measurement result to a higher layer of the terminal device includes:

performing, by the terminal device, RLM in the K BWPs in a fourth time period, to obtain the K bit error rates that correspond one-to-one to the K BWPs; and if L2 bit error rates of the K bit error rates are less than the preset threshold, reporting, by the terminal device, the IS state, where L2 is an integer greater than or equal to 1, and L2 is less than or equal to K.

Specifically, the terminal device performs RLM in each of the K BWPs in the fourth time period, to obtain a measurement value for each BWP. In other words, K measurement values in total are generated for the K BWPs. Further, the bit error rate corresponding to each measurement value is obtained by using a mapping relationship between a measurement value and a bit error rate, that is, the K bit error rates are obtained. Each of the K bit error rates is compared with the preset threshold. If at least L2 bit error rates of the K bit error rates are less than the preset threshold, an IS state is generated, and the IS state is reported to the higher layer of the terminal device; otherwise, no IS state is reported, and the RLM continues to be performed in a next period or evaluation periodicity.

For example, it is assumed that: M=5, where the M BWPs are respectively a BWP #A, a BWP #B, a BWP #C, a BWP #D, and a BWP #E; K=4, where BWPs in which RLM is performed are the BWP #A, the BWP #B, the BWP #C, and the BWP #D; duration of one evaluation periodicity is 100 ms; the measurement value is a power value; and the preset threshold is 0.01.

If L2=3, power values obtained by the terminal device by performing RLM in the four BWPs within 100 ms are respectively −2 dB, −3 dB, −3 dB, and 0 dB, and corresponding bit error rates are respectively 0.005, 0.004, 0.004, and 0.02. Because three of the four bit error rates are all less than the preset threshold, an IS state is generated, and the IS state is reported to the higher layer of the terminal device.

If L2=4, the foregoing example in which only three of the four bit error rates are less than the preset threshold continues to be used. If the condition L2=4 is not met, no IS state is generated, and no IS state is reported to the higher layer of the terminal device.

Optionally, the terminal device receives third indication information sent by the network device, where the third indication information is used to indicate L1.

By way of example, and not limitation, a value of L1 may alternatively be predefined in the system. This is not limited in this embodiment of this application.

Optionally, the terminal device receives fourth indication information sent by the network device, where the fourth indication information is used to indicate L2.

By way of example, and not limitation, a value of L2 may alternatively be predefined in the system. This is not limited in this embodiment of this application.

In a possible implementation, L1=L2.

In an application scenario in which the terminal device performs RLM in a plurality of BWPs in this embodiment of this application, after the terminal device switches from the plurality of previous BWPs to a new BWP, an embodiment of this application further provides a radio link monitoring method for improving accuracy of the RLM.

A radio link monitoring method according to another embodiment of this application is described below in detail with reference to FIG. 15 to FIG. 17.

Figure 15:
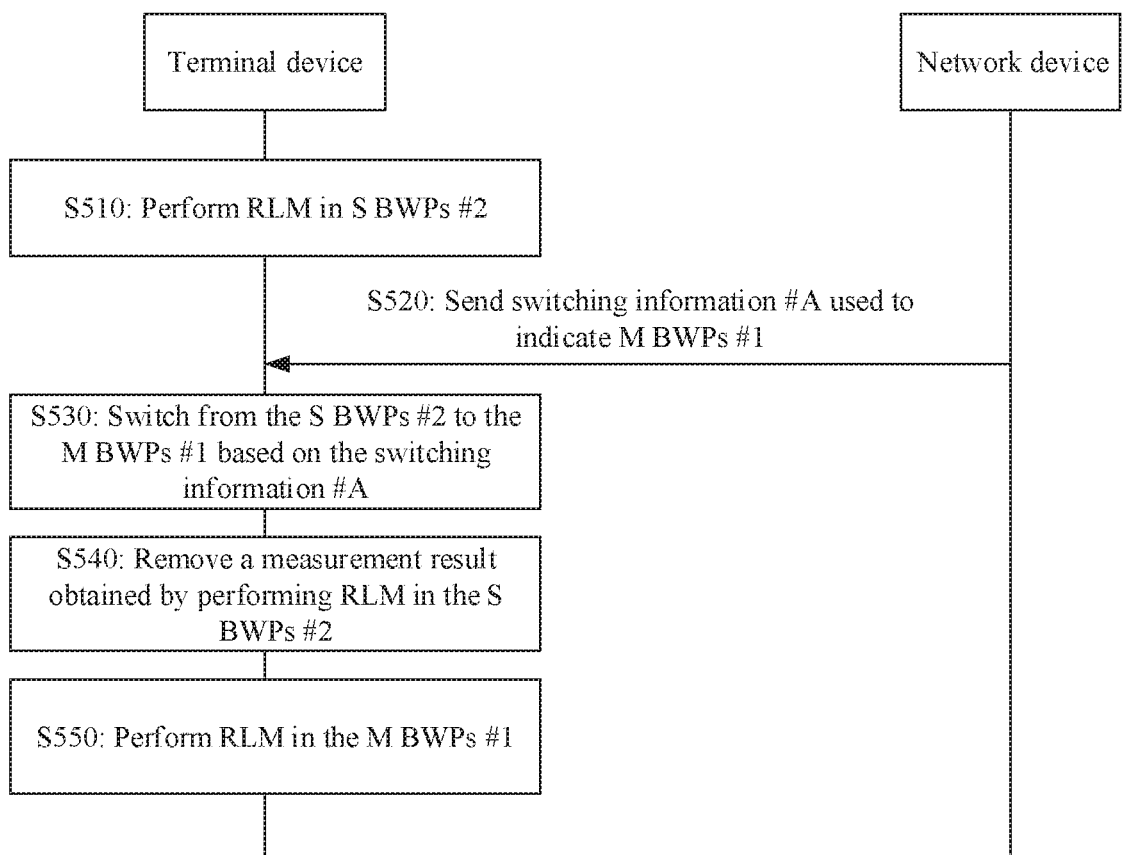
FIG. 15 is a schematic interaction diagram of a radio link monitoring method according to another embodiment of this application.

FIG. 15 is a schematic interaction diagram of a radio link monitoring method 500 according to an embodiment of this application. Each step of the method 500 is described in detail below.

In step S510, a terminal device performs radio link monitoring RLM in S bandwidth parts BWPs #2 (where the BWP #2 is an example of a second BWP), where S is an integer greater than 1.

For a manner in which the terminal device performs radio link monitoring RLM in the S BWPs #2, refer to the descriptions of step S420 in the foregoing method 400. For brevity, details are not described herein again.

In step S520, the terminal device receives switching information #A (where the switching information #A is an example of first switching information) sent by a network device, where the switching information #A is used to indicate that active BWPs include M BWPs #1, and M is an integer greater than 1.

In other words, when the terminal device needs to switch the BWP based on an actual requirement, the network device may notify, by using the switching information #A, the terminal device of a BWP (for example, the M BWPs #1) that can be switched to; or the network device may indicate, by using the switching information #A, the terminal device to switch from the S BWPs #2 in which the RLM is currently performed to the M BWPs #1.

Further, in step S530, the terminal device switches from the S BWPs #2 to the M BWPs #1 based on the switching information #A.

In step S540, the terminal device removes a measurement result obtained by performing RLM in the S second BWPs, where the measurement result includes a quantity N3 of at least some out of synchronization OOS states or a quantity N4 of at least some in synchronization IS states.

If the measurement result includes the quantity N3 of OOS states, N3 may be a quantity of all or some of consecutive OOS states that are counted, when the terminal device switches to the M BWPs #1, by performing RLM in the S BWPs #2.

If the measurement result includes the quantity N4 of IS states, N4 may be a quantity of all or some of consecutive IS states that are counted, when the terminal device switches to the M BWPs #1, by performing RLM in the S BWPs #2.

In step S550, the terminal device performs RLM in K BWPs #1 of the M BWPs #1, where K is an integer greater than 1, and K is less than or equal to M.

Further, a measurement result for a radio link status in the M BWPs #1 is reported to a higher layer of the terminal device.

For a specific manner, refer to the descriptions of step S420 and step S430 in the foregoing method 400. For brevity, details are not described herein again.

The following separately describes, from two phases in which the terminal device reports or counts the measurement result, a specific manner in which the terminal device removes the measurement result.

First phase: Before an RLM timer is enabled (a phase of reporting the OOS state)

The terminal device re-counts, starting from P3, a quantity of consecutive OOS states, where the measurement result includes the quantity N3 of at least some OOS states, P3=Q3−N3, Q3 is a quantity of consecutive OOS states that is counted by the terminal device by performing RLM in the S second BWPs, and N3 is less than or equal to Q3.

A manner in which the terminal device re-counts, starting from P3, the quantity of consecutive OOS states is similar to the manner in which the terminal device re-counts, starting from P1, the quantity of consecutive OOS states in step S140 in the foregoing method 100. Refer to the foregoing manner in which the terminal device re-counts, starting from P1 the quantity of consecutive OOS states. For brevity, details are not described herein again.

Second phase: After the RLM timer is enabled (a phase of reporting the IS state)

The terminal device re-counts, starting from P4, a quantity of consecutive IS states, where the measurement result includes the quantity N4 of at least some IS states, P4=Q4−N4, Q4 is a quantity of consecutive IS states that is counted by the terminal device by performing RLM in the S second BWPs. and N4 is less than or equal to Q4.

A manner in which the terminal device re-counts, starting from P4, the quantity of consecutive IS states is similar to the manner in which the terminal device re-counts, starting from P2, the quantity of consecutive IS states in step S140 in the foregoing method 100. Refer to the foregoing manner in which the terminal device re-counts, starting from P2, the quantity of consecutive IS states. For brevity, details are not described herein again.

In this embodiment of this application, in the phase of reporting the IS state, related processing may further be performed on duration of the RLM timer.

Optionally, the measurement result further includes at least partial duration T3 of total duration recorded from a time at which the RLM timer is enabled to a time at which the RLM timer is stopped; and the removing, by the terminal device, a measurement result obtained by performing RLM in the S second BWPs includes:

restarting, by the terminal device, timing from T4, where T4=T−T3, T is the total duration recorded from the time at which the RLM timer is enabled to the time at which the RLM timer is stopped, and T3 is less than or equal to T.

A manner in which the terminal device restarts timing from T4 is similar to the manner in which the terminal device restarts timing from T2 in step S140 in the foregoing method 100. Refer to the foregoing manner in which the terminal device restart timing from T2. For brevity, details are not described herein again.

Therefore, according to the radio link monitoring method provided in this embodiment of this application, in a scenario in which the terminal device performs RLM in a plurality of BWPs, after switching from the S second BWPs in which the RLM is currently performed to the M first BWPs, the terminal device removes the measurement result obtained by performing RLM in the S second BWPs, where the measurement result is all or some of measurement results obtained by performing RLM in the S second BWPs, so that the terminal device does not use the measurement result in a process of performing RLM in the M first BWPs, thereby effectively improving accuracy of the RLM performed by the terminal device in the switched M first BWPs, and further improving communication quality.

Optionally, the M first BWPs and the S second BWPs do not overlap at all.

To be specific, when the M BWPs #1 and the S BWPs #2 do not overlap at all, the terminal device determines that all or some of the measurement results obtained by performing RLM in the S BWPs #2 cannot be used, and performs RLM in the M BWPs #1 after removing the measurement result.

By way of example, and not limitation, the network device may alternatively notify, by using signaling, the terminal device whether the measurement result can be removed.

Optionally, the method further includes:

receiving, by the terminal device, indication information sent by the network device, where the indication information is used to indicate the terminal device to remove the measurement result in the process of performing RLM in the M first BWPs.

In this embodiment of this application, the terminal device may remove the measurement result obtained by performing RLM in the S BWPs #2, or continue to use the measurement result obtained by performing RLM in the S BWPs #2.

That the terminal device removes the measurement result obtained by performing RLM in the S BWPs #2 is described above. A method in which the terminal device continues to use the measurement result is described below in detail by using a method 600 and a method 700.

Figure 16:
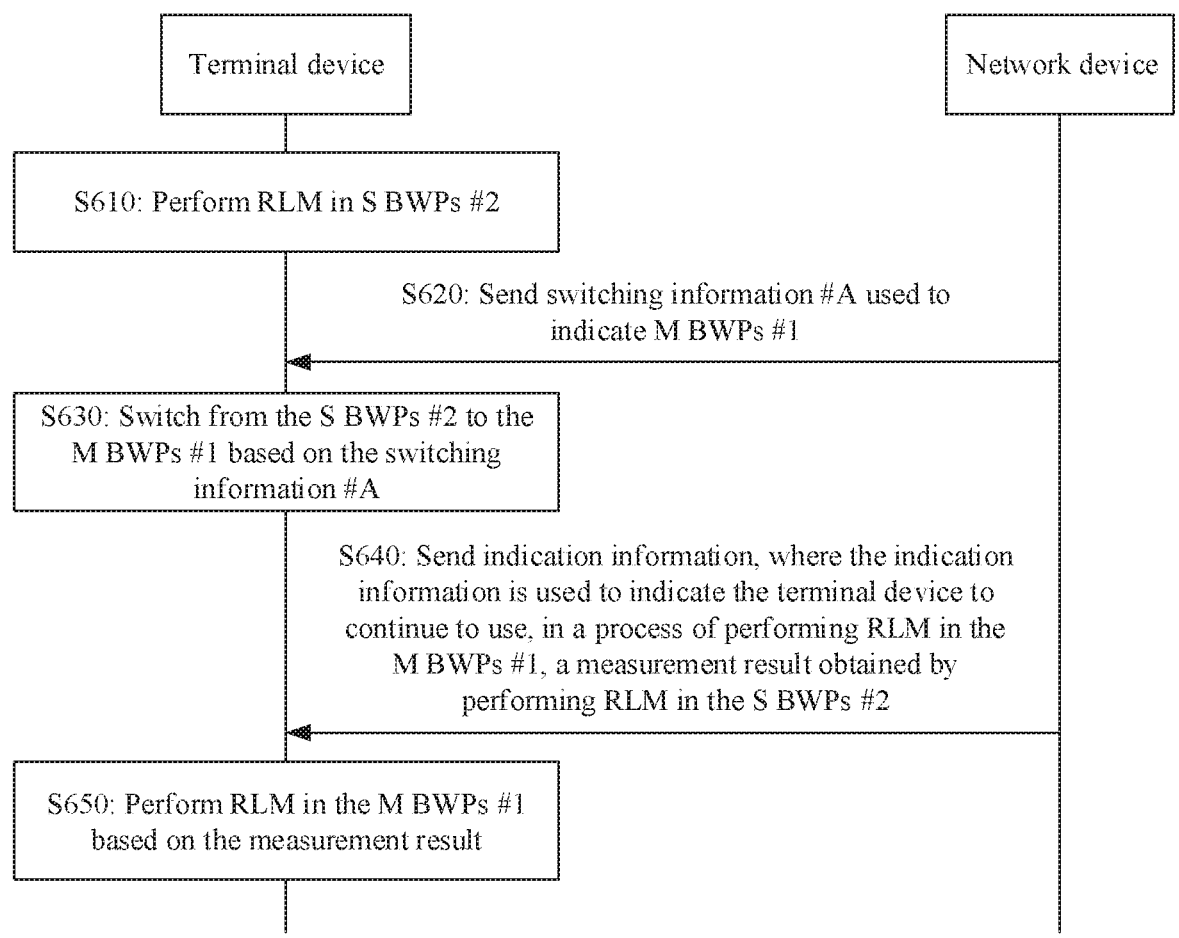
FIG. 16 is a schematic interaction diagram of a radio link monitoring method according to another embodiment of this application.

FIG. 16 is a schematic interaction diagram of the radio link monitoring method 600 according to an embodiment of this application. Each step of the method 600 is described in detail below.

In step S610, a terminal device performs radio link monitoring RLM in S bandwidth parts BWPs #2 (where the BWP #2 is an example of a second BWP), where S is an integer greater than 1.

For a manner in which the terminal device performs radio link monitoring RLM in the S BWPs #2, refer to the descriptions of step S420 in the foregoing method 400. For brevity, details are not described herein again.

In step S620, a network device sends switching information #A (where the switching information #A is an example of first switching information), where the switching information #A is used to indicate that active BWPs include M BWPs #1, and M is an integer greater than 1.

For descriptions of step S620, refer to the descriptions of step S120 in the foregoing method 100.

In step S630, the terminal device switches from the S BWPs #2 to the M BWPs #1 based on the switching information #A.

In step S640, the terminal device receives indication information sent by the network device, where the indication information is used to indicate the terminal device to continue to use, in a process of performing RLM in the M BWPs #1, a measurement result obtained by performing RLM in the S BWPs #2 and the measurement result includes a quantity N3 of at least some out of synchronization OOS states or a quantity N4 of at least some in synchronization IS states.

The measurement result may be all or some of measurement results obtained by the terminal device by performing RLM in the S BWPs #2.

If the measurement result includes the quantity N3 of OOS states, N3 may be a quantity of all or some of consecutive OOS states that are counted, when the terminal device switches to the M BWPs #1, by performing RLM in the S BWPs #2.

If the measurement result includes the quantity N4 of IS states, N4 may be a quantity of all or some of consecutive IS states that are counted, when the terminal device switches to the M BWPs #1, by performing RLM in the S BWPs #2.

In step S650, the terminal device performs RLM in the M BWPs #1 based on the measurement result.

In other words, the terminal device continues to use the measurement result obtained by performing RLM in the S BWPs #2, to perform RLM in the M BWPs #1.

The following separately describes, from two phases in which the terminal device reports or counts the measurement result, a specific manner in which the terminal device continues to use the measurement result.

First phase: Before an RLM timer is enabled (a phase of reporting the OOS state)

The terminal device continues to count, starting from N3, a quantity of consecutive OOS states, where the measurement result includes the quantity N3 of at least some OOS states.

A manner in which the terminal device continues to count, starting from N3, the quantity of consecutive OOS states is similar to the manner in which the terminal device continues to count, starting from N1, the quantity of consecutive OOS states in step S250 in the foregoing method 200. Refer to the foregoing manner in which the terminal device continues to count, starting from N1, the quantity of consecutive OOS states. For brevity, details are not described herein again.

Second phase: Before the RLM timer is enabled (a phase of reporting the IS state)

The terminal device continues to count, starting from N4, a quantity of consecutive IS states, where the measurement result includes the quantity N4 of at least some IS states.

A manner in which the terminal device continues to count, starting from N4, the quantity of consecutive IS states is similar to the manner in which the terminal device continues to count, starting from N2, the quantity of consecutive IS states in step 250 in the foregoing method 200. Refer to the foregoing manner in which the terminal device continues to count, starting from N2, the quantity of consecutive IS states. For brevity, details are not described herein again.

Optionally, the measurement result further includes at least partial duration T3 of total duration recorded from a time at which the RLM timer is enabled to a time at which the RLM timer is stopped; and the performing, by the terminal device, RLM in the M BWPs #1 based on the measurement result includes:

continuing, by the terminal device, to perform timing from T3.

A manner in which the terminal device continues to perform timing from T3 is similar to the manner in which the terminal device continues to perform timing from T1 in step S250 in the foregoing method 200. Refer to the foregoing manner in which the terminal device continues to perform timing from T1. For brevity, details are not described herein again.

Therefore, according to the radio link monitoring method provided in this embodiment of this application, in a scenario in which the terminal device performs RLM in a plurality of BWPs, the network device sends, to the terminal device, the indication information used to indicate the terminal device to continue to use, in a process of performing RLM in the M first BWPs, the measurement result obtained by performing RLM in the S second BWPs, where the measurement result is all or some of the measurement results obtained by performing RLM in the S second BWPs, so that the terminal device may continue to use the measurement result in the process of performing RLM in the M first BWPs, thereby reducing implementation complexity.

Optionally, the M BWPs #1 and the S BWPs #2 partially overlap.

To be specific, when the M BWPs #1 and the S BWPs #2 partially overlap, the network device considers that the measurement result may be used in the process of performing RLM in the M BWPs #1, and this has little impact on accuracy of the RLM. Therefore, the indication information may be used to indicate the terminal device to continue to use the measurement result in the process of performing RLM in the M BWPs #1. In addition, implementation complexity can further be reduced.

Figure 17:
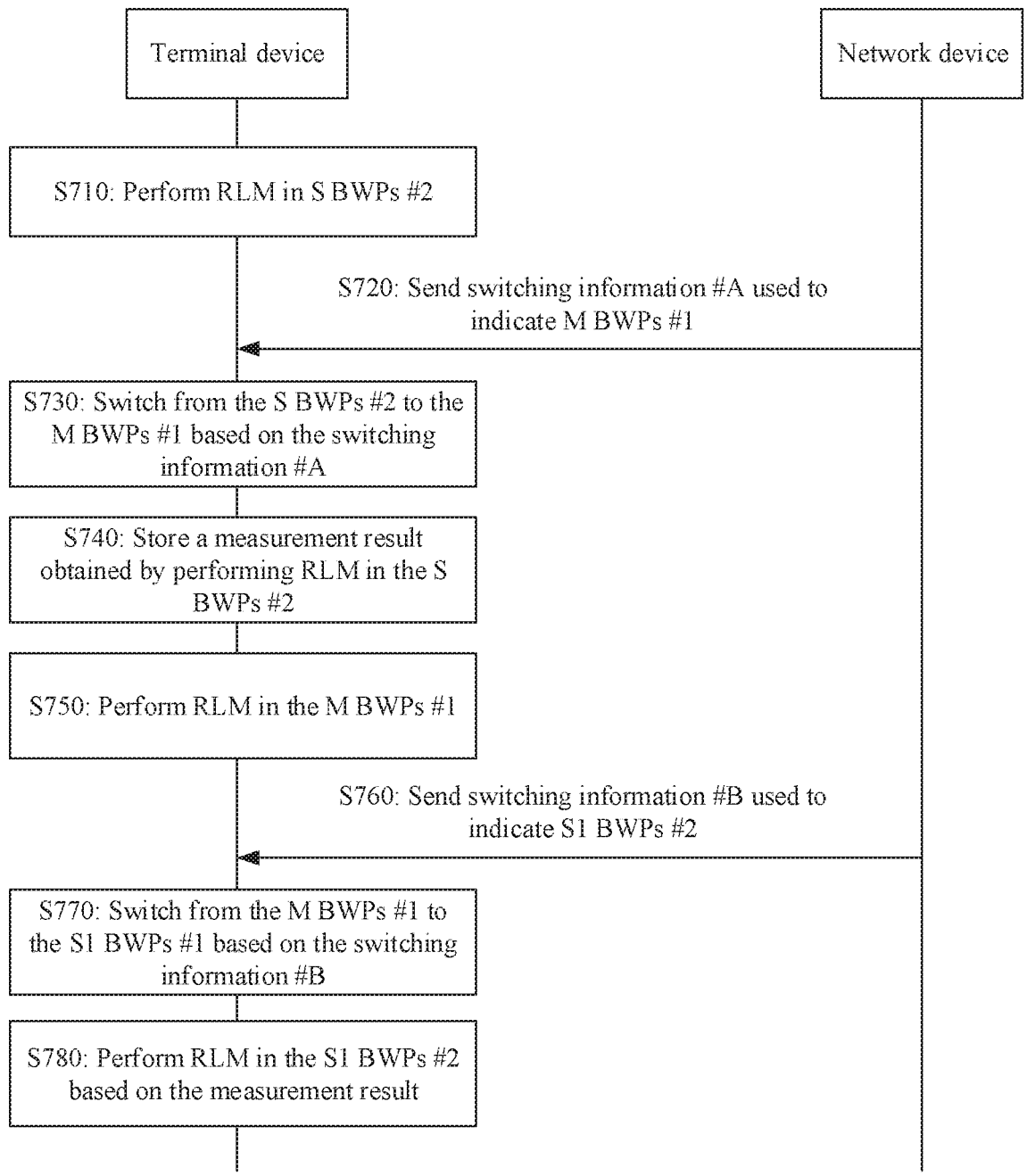
FIG. 17 is a schematic interaction diagram of a radio link monitoring method according to still another embodiment of this application.

FIG. 17 is a schematic interaction diagram of the radio link monitoring method 700 according to an embodiment of this application. Each step of the method 700 is described in detail below.

In step S710, a terminal device performs radio link monitoring RLM in S bandwidth parts BWPs #2 (namely, second BWPs), where S is an integer greater than 1.

For a manner in which the terminal device performs radio link monitoring RLM in the S BWPs #2 (where the BWP #2 is an example of a second BWP), refer to the descriptions of step S420 in the foregoing method 400. For brevity, details are not described herein again.

In step S720, a network device sends switching information #A (where the switching information #A is an example of first switching information), where the switching information #A is used to indicate that active BWPs include M BWPs #1, and M is an integer greater than 1.

For descriptions of sending the switching information #A by the network device, refer to the descriptions of step S520 in the foregoing method 500.

In step S730, the terminal device switches from the S BWPs #2 to the M BWPs #1 based on the switching information #A.

In step S740, the terminal device stores a measurement result obtained by performing RLM in the S BWPs #2, where the measurement result includes a quantity N3 of at least some out of synchronization OOS states or a quantity N4 of at least some in synchronization IS states.

In step S750, the terminal device performs RLM in the M BWPs #1.

In this embodiment of this application, when performing RLM in the M BWPs #1, the terminal device, the terminal device may perform RLM in the M BWPs #1 in a manner of the method 500, to be specific, by removing the measurement result obtained by performing RLM in the S BWPs #2. For a specific implementation, refer to related descriptions of the method 500. For brevity, details are not described herein again.

Alternatively, when performing RLM in the M BWPs #1, the terminal device may perform RLM in the M BWPs #1 in a manner of the method 600, to be specific, by continuing to use the measurement result obtained by performing RLM in the S BWPs #2. For a specific implementation, refer to related descriptions of the method 600. For brevity, details are not described herein again.

In step S760, the network device sends switching information #B (where the switching information #B is an example of second switching information), where the switching information #B is used to indicate S BWPs #2 of the S BWPs #2, and S1 is an integer greater than or equal to 1.

The S1 BWPs #2 are some or all bandwidth parts of the S BWPs #2.

For descriptions of sending the switching information #B by the network device, refer to the descriptions of step S520 in the foregoing method 500.

In step S770, the terminal device switches from the M BWPs #A to the S1 BWPs #B based on the switching information #B.

In step S780, the terminal device performs RLM in the S1 BWPs #2 based on the measurement result.

In other words, the terminal device may perform RLM in the S1 BWPs #2 by continuing to use the measurement result.

For a manner in which the terminal device performs RLM in the S1 BWPs #2 by continuing to use the measurement result, refer to the manner in which the terminal device continues to use the measurement result in the two phases of reporting or counting the measurement result in step S650 in the method 600. A unique difference is as follows: A measurement object in the method 700 is the S1 BWPs #2, and a measurement object in the method 600 is the M BWPs #1. Therefore, for brevity, details are not described herein again.

Then, the terminal device reports the measurement result for a radio link status in the S1 BWPs #2 to a higher layer of the terminal device.

For a specific manner in which the terminal device reports the measurement result to the higher layer of the terminal device, refer to the descriptions of step S430 in the foregoing method 400. For brevity, details are not described herein again.

Optionally, if an interval between a time at which the terminal device switches from the S BWPs #2 to the M BWPs #1 and a time at which the terminal device switches from the M BWPs #1 to the S1 BWPs #2 is less than a preset threshold, the terminal device performs RLM in the S1 BWPs #2 by continuing to use the measurement result.

Therefore, according to the radio link monitoring method provided in this application, in a scenario in which the terminal device performs RLM in a plurality of BWPs, after switching from the S second BWPs in which the RLM is currently performed to the M first BWPs, the terminal device may store the measurement result obtained by performing RLM in the S second BWPs, where the measurement result is all or some of the measurement results obtained by performing RLM in the S second BWPs, so that after subsequently switching from the M first BWPs to the S second BWPs of the S second BWPs, the terminal device may perform RLM in the S1 second BWP by continuing to use the measurement result, thereby reducing implementation complexity.

It should be understood that sequence numbers in each of the foregoing methods do not mean execution sequences, and the execution sequences of the steps should be determined based on functions and internal logic of the steps.

The foregoing describes in detail the radio link monitoring methods according to the embodiments of this application with reference to FIG. 1 to FIG. 17. The following describes radio link monitoring apparatuses according to the embodiments of this application with reference to FIG. 18 to FIG. 24. Technical features described in the method embodiments are also applicable to the following apparatus embodiments.

Figure 18:
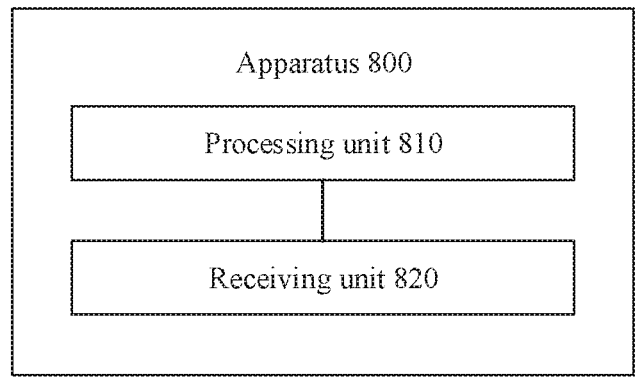
FIG. 18 to FIG. 27 each are a schematic block diagram of a radio link monitoring apparatus according to an embodiment of this application.

FIG. 18 is a schematic block diagram of a radio link monitoring apparatus 800 according to an embodiment of this application. As shown in FIG. 18, the apparatus 800 includes:

a processing unit 810, configured to perform radio link monitoring RLM in a second bandwidth part BWP; and a receiving unit 820, configured to receive first switching information sent by a network device, where the first switching information is used to indicate that an active bandwidth part BWP includes a first BWP, where the processing unit 810 is further configured to:

switch from the second BWP to the first BWP based on the first switching information:

remove a measurement result obtained by performing RLM in the second BWP, where the measurement result includes a quantity N1 of at least some out of synchronization OOS states or a quantity N2 of at least some in synchronization IS states; and perform RLM in the first BWP.

In a possible implementation, the processing unit 810 is specifically configured to:

count, starting from P1, a quantity of consecutive OOS states, where the measurement result includes the quantity N1 of at least some OOS states, P1=Q1-N1, Q1 is a quantity of consecutive OOS states that is counted by the apparatus by performing RLM in the second BWP, and N1 is less than or equal to Q1; or count, starting from P2, a quantity of consecutive IS states, where the measurement result includes the quantity N2 of at least some IS states, P2=Q2-N2. Q2 is a quantity of consecutive IS states that is counted by the apparatus by performing RLM in the second BWP, and N2 is less than or equal to Q2.

In a possible implementation, the measurement result further includes at least partial duration T1 of total duration recorded from a time at which an RLM timer is enabled to a time at which the RLM timer is stopped; and the processing unit 810 is specifically configured to:

start timing from T2, where T2=T-T1, T is the total duration recorded from the time at which the RLM timer is enabled to the time at which the RLM timer is stopped, and T1 is less than or equal to T.

In a possible implementation, the first BWP and the second BWP do not overlap at all or partially overlap.

In a possible implementation, the receiving unit 820 is further configured to:

receive indication information sent by the network device, where the indication information is used to indicate the apparatus to remove the measurement result in a process of performing RLM in the first BWP.

The radio link monitoring apparatus 800 may correspond to (for example, may be configured to or the apparatus may be) the terminal device described in the method 100. In addition, each module or unit in the radio link monitoring apparatus 800 is configured to perform each action or processing process performed by the terminal device in the method 100. To avoid repetition, details are not described herein again.

In this embodiment of this application, the apparatus 800 may be a terminal device. The terminal device may include a processor, a transmitter, and a receiver. The processor, the transmitter, and the receiver are in communication connection. Optionally, the terminal device further includes a memory, and the memory and the processor are in communication connection. Optionally, the processor, the memory, the transmitter, and the receiver may be in communication connection. The memory may be configured to store an instruction. The processor is configured to execute the instruction stored in the memory, to control the transmitter to send information or control the receiver to receive a signal.

In this case, the processing unit 810 of the apparatus 800 shown in FIG. 18 may correspond to the processor of the terminal device.

The receiving unit 820 of the apparatus 800 shown in FIG. 18 may correspond to the receiver of the terminal device.

In this embodiment of this application, the apparatus 800 may be a chip (or a chip system) installed in a terminal device. In this case, the apparatus 800 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver may be in communication connection. The memory may be configured to store an instruction. The processor is configured to execute the instruction stored in the memory, to control the transceiver to send information or a signal.

In this case, the processing unit 810 of the apparatus 800 shown in FIG. 18 may correspond to the processor, and the receiving unit 820 of the apparatus 800 shown in FIG. 18 may correspond to the input/output interface.

Figure 19:
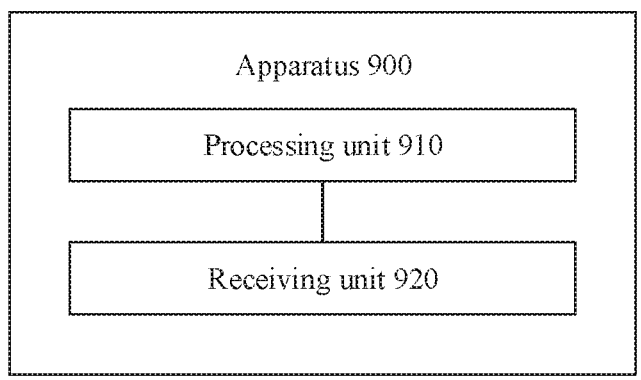

FIG. 19 is a schematic block diagram of a radio link monitoring apparatus 900 according to an embodiment of this application. As shown in FIG. 19, the apparatus 900 includes:

a processing unit 910, configured to perform radio link monitoring RLM in a second bandwidth part BWP; and a receiving unit 920, configured to receive first switching information sent by a network device, where the first switching information is used to indicate that an active bandwidth part BWP includes a first BWP, where the processing unit 910 is further configured to switch from the second BWP to the first BWP based on the first switching information;

the receiving unit 920 is further configured to receive indication information sent by the network device, where the indication information is used to indicate the apparatus to continue to use, in a process of performing RLM in the first BWP, a measurement result obtained by performing RLM in the second BWP; and the measurement result includes a quantity N1 of at least some out of synchronization OOS states or a quantity N2 of at least some in synchronization IS states; and the processing unit 910 is further configured to perform RLM in the first BWP based on the measurement result.

In a possible implementation, the first BWP and the second BWP partially overlap, or the first BWP and the second BWP do not overlap.

In a possible implementation, the processing unit 910 is specifically configured to:

count, starting from N1, a quantity of consecutive OOS states, where the measurement result includes the quantity N1 of at least some OOS states; or count, starting from N2, a quantity of consecutive IS states, where the measurement result includes the quantity N2 of at least some IS states.

In a possible implementation, the measurement result further includes at least partial duration T1 of total duration recorded from a time at which an RLM timer is enabled to a time at which the RLM timer is stopped; and the processing unit 910 is further configured to:

start timing from T1.

Therefore, according to the radio link monitoring apparatus provided in this embodiment of this application, the network device sends the indication information used to indicate the apparatus to continue to use, in the process of performing RLM in the first BWP, the measurement result obtained by performing RLM in the second BWP, where the measurement result is all or some of measurement results obtained by performing RLM in the second BWP, so that the apparatus may continue to use the measurement result in the process of performing RLM in the first BWP, thereby improving RLM efficiency.

The radio link monitoring apparatus 90 may correspond to (for example, may be configured to or the apparatus may be) the terminal device described in the method 200. In addition, each module or unit in the radio link monitoring apparatus 900 is configured to perform each action or processing process performed by the terminal device in the method 200. To avoid repetition, details are not described herein again.

In this embodiment of this application, the apparatus 900 may be a terminal device. The terminal device may include a processor, a transmitter, and a receiver. The processor, the transmitter, and the receiver are in communication connection. Optionally, the terminal device further includes a memory, and the memory and the processor are in communication connection. Optionally, the processor, the memory, the transmitter, and the receiver may be in communication connection. The memory may be configured to store an instruction. The processor is configured to execute the instruction stored in the memory, to control the transmitter to send information or control the receiver to receive a signal.

In this case, the processing unit 910 of the apparatus 900 shown in FIG. 19 may correspond to the processor of the terminal device.

The receiving unit 920 of the apparatus 900 shown in FIG. 19 may correspond to the receiver of the terminal device.

In this embodiment of this application, the apparatus 900 may be a chip (or a chip system) installed in a terminal device. In this case, the apparatus 900 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver may be in communication connection. The memory may be configured to store an instruction. The processor is configured to execute the instruction stored in the memory, to control the transceiver to send information or a signal.

In this case, the processing unit 910 of the apparatus 900 shown in FIG. 19 may correspond to the processor, and the receiving unit 920 of the apparatus 900 shown in FIG. 19 may correspond to the input/output interface.

Figure 20:
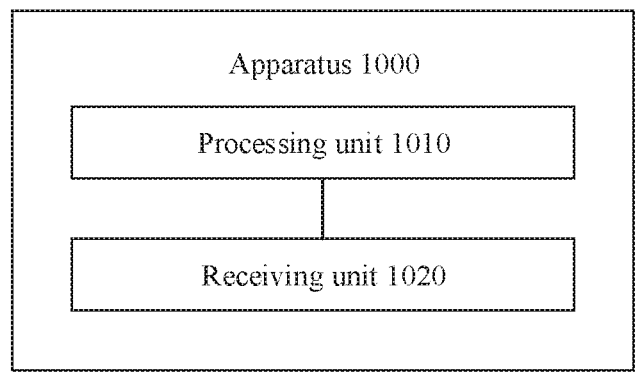

FIG. 20 is a schematic block diagram of a radio link monitoring apparatus 1000 according to an embodiment of this application. As shown in FIG. 20, the apparatus 1000 includes:

a processing unit 1010, configured to perform radio link monitoring RLM in a second bandwidth part BWP; and a receiving unit 1020, configured to receive first switching information sent by a network device, where the first switching information is used to indicate that an active BWP includes a first BWP, where the processing unit 1010 is further configured to:
switch from the second BWP to the first BWP based on the first switching information;

store a measurement result obtained by performing RLM in the second BWP, where the measurement result includes a quantity N1 of at least some out of synchronization OOS states or a quantity N2 of at least some in synchronization IS states; and perform RLM in the first BWP;

the receiving unit 1020 is further configured to receive second switching information sent by the network device, where the second switching information is used to indicate that the active BWP includes the second BWP; and the processing unit 1010 is further configured to:
switch from the first BWP to the second BWP based on the second switching information; and perform RLM in the second BWP based on the measurement result.

In a possible implementation, the processing unit 1010 is specifically configured to:

count, starting from N1, a quantity of consecutive OOS states, where the measurement result includes the quantity N1 of at least some OOS states; or count, starting from N2, a quantity of consecutive IS states, where the measurement result includes the quantity N2 of at least some IS states.

In a possible implementation, the measurement result further includes at least partial duration T1 of total duration recorded from a time at which an RLM timer is enabled to a time at which the RLM timer is stopped; and the processing unit 1010 is specifically configured to:
start timing from T1.

Therefore, according to the radio link monitoring apparatus provided in this application, after switching from the second BWP in which the RLM is currently performed to the first BWP, the apparatus may store the measurement result obtained by performing RLM in the second BWP, where the measurement result is all or some of measurement results obtained by performing RLM in the second BWP, so that after subsequently switching from the first BWP to the second BWP, the apparatus may continue to perform RLM in the second BWP by continuing to use the measurement result, thereby reducing implementation complexity.

The radio link monitoring apparatus 1000 may correspond to (for example, may be configured to or the apparatus may be) the terminal device described in the method 300. In addition, each module or unit in the radio link monitoring apparatus 1000 is configured to perform each action or processing process performed by the terminal device in the method 300. To avoid repetition, details are not described herein again.

In this embodiment of this application, the apparatus 1000 may be a terminal device. The terminal device may include a processor, a transmitter, and a receiver. The processor, the transmitter, and the receiver are in communication connection. Optionally, the terminal device further includes a memory, and the memory and the processor are in communication connection. Optionally, the processor, the memory, the transmitter, and the receiver may be in communication connection. The memory may be configured to store an instruction. The processor is configured to execute the instruction stored in the memory, to control the transmitter to send information or control the receiver to receive a signal.

In this case, the processing unit 1010 of the apparatus 1000 shown in FIG. 20 may correspond to the processor of the terminal device, and the receiving unit 1020 of the apparatus 1000 shown in FIG. 20 may correspond to the receiver of the terminal device.

In this embodiment of this application, the apparatus 1000 may be a chip (or a chip system) installed in a terminal device. In this case, the apparatus 1000 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver may be in communication connection. The memory may be configured to store an instruction. The processor is configured to execute the instruction stored in the memory, to control the transceiver to send information or a signal.

In this case, the processing unit 1010 of the apparatus 1000 shown in FIG. 20 may correspond to the processor, and the receiving unit 1020 of the apparatus 1000 shown in FIG. 20 may correspond to the input/output interface.

Figure 21:
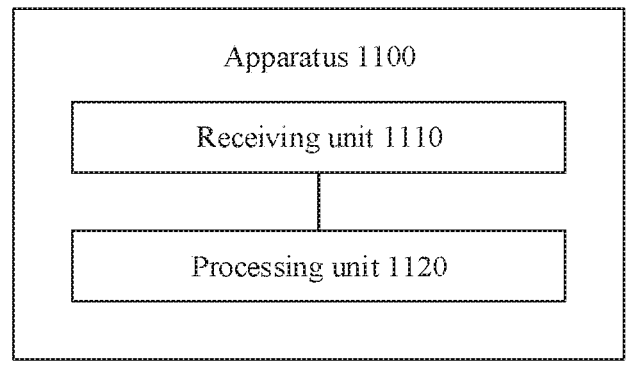

FIG. 21 is a schematic block diagram of a radio link monitoring apparatus 1100 according to an embodiment of this application. As shown in FIG. 21, the apparatus 1100 includes:

a receiving unit 1110, configured to receive first indication information sent by a network device, where the first indication information is used to indicate that active bandwidth parts BWPs include M BWPs, and M is an integer greater than 1; and a processing unit 1120, configured to perform RLM in K BWPs of the M BWPs based on the first indication information, where K is an integer greater than 1, and K is less than or equal to M, where the processing unit 1120 is further configured to report a measurement result to a higher layer of the apparatus, where the measurement result includes an out of synchronization OOS state or an in synchronization IS state.

In a possible implementation, the processing unit 1120 is specifically configured to:

average K measurement values that are obtained by performing RLM in the K BWPs in a first time period, to obtain a first average measurement value, where the K BWPs correspond one-to-one to the K measurement values; and if a bit error rate obtained based on the first average measurement value is greater than a preset threshold, report the OOS state.

In a possible implementation, the processing unit 1120 is specifically configured to:

average K measurement values that are obtained by performing RLM in the K BWPs in a second time period, to obtain a second average measurement value, where the K BWPs correspond one-to-one to the K measurement values; and if a bit error rate obtained based on the second average measurement value is less than a preset threshold, report the IS state.

In a possible implementation, the processing unit 1120 is specifically configured to:

perform RLM in the K BWPs in a third time period, to obtain K bit error rates that correspond one-to-one to the K BWPs; and if L1 bit error rates of the K bit error rates are all greater than a preset threshold, report the OOS state, where L1 is an integer greater than or equal to 1, and L1 is less than or equal to K.

In a possible implementation, the processing unit 1120 is specifically configured to:

perform RLM in the K BWPs in a fourth time period, to obtain K bit error rates that correspond one-to-one to the K BWPs; and if L2 bit error rates of the K bit error rates are less than a preset threshold, report the IS state, where L2 is an integer greater than or equal to 1, and L2 is less than or equal to K.

In a possible implementation, the receiving unit 1110 is further configured to:

receive second indication information sent by the network device, where the second indication information is used to indicate the K BWPs, and K is less than M; and the processing unit 1120 is specifically configured to:

perform RLM in the K BWPs of the M BWPs based on the first indication information and the second indication information.

Therefore, according to the radio link monitoring apparatus provided in this embodiment of this application, when the apparatus can perform wireless communication by using the M BWPs, the apparatus can determine a radio link status of the apparatus by performing RLM in the K BWPs of the M BWPs, thereby effectively reducing complexity of the RLM.

The radio link monitoring apparatus 1100 may correspond to (for example, may be configured to or the apparatus may be) the terminal device described in the method 400. In addition, each module or unit in the radio link monitoring apparatus 1100 is configured to perform each action or processing process performed by the terminal device in the method 400. To avoid repetition, details are not described herein again.

In this embodiment of this application, the apparatus 110 may be a terminal device. The terminal device may include a processor, a transmitter, and a receiver. The processor, the transmitter, and the receiver are in communication connection. Optionally, the terminal device further includes a memory, and the memory and the processor are in communication connection. Optionally, the processor, the memory, the transmitter, and the receiver may be in communication connection. The memory may be configured to store an instruction. The processor is configured to execute the instruction stored in the memory, to control the transmitter to send information or control the receiver to receive a signal.

In this case, the processing unit 1120 of the apparatus 1100 shown in FIG. 21 may correspond to the processor of the terminal device, and the receiving unit 1110 of the apparatus 1100 shown in FIG. 21 may correspond to the receiver of the terminal device.

In this embodiment of this application, the apparatus 1100 may be a chip (or a chip system) installed in a terminal device. In this case, the apparatus 1100 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver may be in communication connection. The memory may be configured to store an instruction. The processor is configured to execute the instruction stored in the memory, to control the transceiver to send information or a signal.

In this case, the processing unit 1120 of the apparatus 1100 shown in FIG. 21 may correspond to the processor, and the receiving unit 1110 of the apparatus 1100 shown in FIG. 21 may correspond to the input/output interface.

Figure 22:
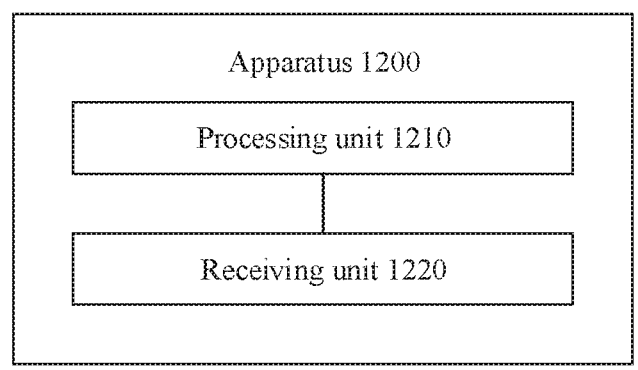

FIG. 22 is a schematic block diagram of a radio link monitoring apparatus 1200 according to an embodiment of this application. As shown in FIG. 22, the apparatus 1200 includes:

a processing unit 1210, configured to perform radio link monitoring RLM in S second bandwidth parts BWPs, where S is an integer greater than 1; and a receiving unit 1220, configured to receive first switching information sent by a network device, where the first switching information is used to indicate that active BWPs include M first BWPs, and M is an integer greater than 1, where the processing unit 1210 is further configured to:

switch from the S second BWPs to the M first BWPs based on the first switching information;

remove a measurement result obtained by performing RLM in the S second BWPs, where the measurement result includes a quantity N3 of at least some out of synchronization OOS states or a quantity N4 of at least some in synchronization IS states; and perform RLM in K first BWPs of the M first BWPs, where K is an integer greater than 1, and K is less than or equal to M.

In a possible implementation, the processing unit 1210 is specifically configured to:

count, starting from P3, a quantity of consecutive OOS states, where the measurement result includes the quantity N3 of at least some OOS states, P3=Q3-N3. Q3 is a quantity of consecutive OOS states that is counted by the apparatus by performing RLM in the S second BWPs, and N3 is less than or equal to Q3; or count, starting from P4, a quantity of consecutive IS states, where the measurement result includes the quantity N4 of at least some IS states, P4=Q4-N4, Q4 is a quantity of consecutive IS states that is counted by the apparatus by performing RLM in the S second BWPs, and N4 is less than or equal to Q4.

In a possible implementation, the measurement result further includes at least partial duration T3 of total duration recorded from a time at which an RLM timer is enabled to a time at which the RLM timer is stopped; and the processing unit 1210 is specifically configured to:

start timing from T4, where T4=T−T3, T is the total duration recorded from the time at which the RLM timer is enabled to the time at which the RLM timer is stopped, and T3 is less than or equal to T.

In a possible implementation, the M first BWPs and the S second BWPs do not overlap at all.

In a possible implementation, the receiving unit 1220 is further configured to:

receive indication information sent by the network device, where the indication information is used to indicate the apparatus to remove the measurement result in a process of performing RLM in the M first BWPs.

In a possible implementation, the processing unit 1210 is specifically configured to:

average K measurement values that are obtained by performing RLM in the K BWPs in a first time period, to obtain a first average measurement value, where the K BWPs correspond one-to-one to the K measurement values; and if a bit error rate obtained based on the first average measurement value is greater than a preset threshold, report the OOS state.

In a possible implementation, the processing unit 1210 is specifically configured to:

average K measurement values that are obtained by performing RLM in the K BWPs in a second time period, to obtain a second average measurement value, where the K BWPs correspond one-to-one to the K measurement values; and if a bit error rate obtained based on the second average measurement value is less than a preset threshold, report the IS state.

In a possible implementation, the processing unit 1210 is specifically configured to:

perform RLM in the K BWPs in a third time period, to obtain K bit error rates that correspond one-to-one to the K BWPs; and if L1 bit error rates of the K bit error rates are all greater than a preset threshold, report the OOS state, where L1 is an integer greater than or equal to 1, and L1 is less than or equal to K.

In a possible implementation, the processing unit 1210 is specifically configured to:

perform RLM in the K BWPs in a fourth time period, to obtain K bit error rates that correspond one-to-one to the K BWPs; and if L2 bit error rates of the K bit error rates are all less than a preset threshold, report the IS state, where L2 is an integer greater than or equal to 1, and L2 is less than or equal to K.

In a possible implementation, the receiving unit 1220 is further configured to:

receive second indication information sent by the network device, where the second indication information is used to indicate the K BWPs, and K is less than M; and the performing RLM in K first BWPs of the M first BWPs includes:

performing RLM in the K BWPs based on the second indication information.

The radio link monitoring apparatus 1200 may correspond to (for example, may be configured to or the apparatus may be) the terminal device described in the method 500. In addition, each module or unit in the radio link monitoring apparatus 1200 is configured to perform each action or processing process performed by the terminal device in the method 500. To avoid repetition, details are not described herein again.

In this embodiment of this application, the apparatus 1200 may be a terminal device. The terminal device may include a processor, a transmitter, and a receiver. The processor, the transmitter, and the receiver are in communication connection. Optionally, the terminal device further includes a memory, and the memory and the processor are in communication connection. Optionally, the processor, the memory, the transmitter, and the receiver may be in communication connection. The memory may be configured to store an instruction. The processor is configured to execute the instruction stored in the memory, to control the transmitter to send information or control the receiver to receive a signal.

In this case, the processing unit 1210 of the apparatus 1200 shown in FIG. 22 may correspond to the processor of the terminal device, and the receiving unit 1220 of the apparatus 1200 shown in FIG. 22 may correspond to the receiver of the terminal device.

In this embodiment of this application, the apparatus 1200 may be a chip (or a chip system) installed in a terminal device. In this case, the apparatus 1200 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver may be in communication connection. The memory may be configured to store an instruction. The processor is configured to execute the instruction stored in the memory, to control the transceiver to send information or a signal.

In this case, the processing unit 1210 of the apparatus 1200 shown in FIG. 22 may correspond to the processor, and the receiving unit 1220 of the apparatus 1200 shown in FIG. 22 may correspond to the input/output interface.

Figure 23:
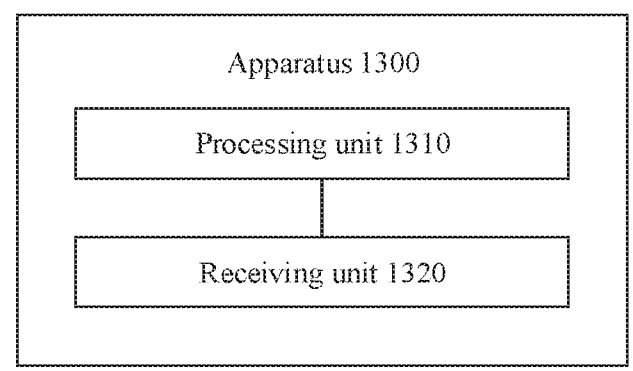

FIG. 23 is a schematic block diagram of a radio link monitoring apparatus 1300 according to an embodiment of this application. As shown in FIG. 23, the apparatus 1300 includes:

a processing unit 1310, configured to perform radio link monitoring RLM in S second bandwidth parts BWPs, where S is an integer greater than 1; and a receiving unit 1320, configured to receive first switching information sent by a network device, where the first switching information is used to indicate that active bandwidth parts BWPs include M first BWPs, and M is an integer greater than 1, where the processing unit 1310 is further configured to switch from the S second BWPs to the M first BWPs based on the first switching information:

the receiving unit 1320 is further configured to receive indication information sent by the network device, where the indication information is used to indicate the apparatus to continue to use, in a process of performing RLM in the M first BWPs, a measurement result obtained by performing RLM in the S second BWPs; and the measurement result includes a quantity N3 of at least some out of synchronization OOS states or a quantity N4 of at least some in synchronization IS states; and the processing unit 1310 is further configured to perform RLM in the M first BWPs based on the measurement result.

In a possible implementation, the M first BWPs and the S second BWPs partially overlap.

In a possible implementation, the processing unit 1310 is further configured to:

count, starting from N3, a quantity of consecutive OOS states, where the measurement result includes the quantity N3 of at least some OOS states; or count, starting from N4, a quantity of consecutive IS states, where the measurement result includes the quantity N4 of at least some IS states.

In a possible implementation, the measurement result further includes at least partial duration T3 of total duration recorded from a time at which an RLM timer is enabled to a time at which the RLM timer is stopped; and the processing unit 1310 is further configured to:
start timing from T3.

The radio link monitoring apparatus 1300 may correspond to (for example, may be configured to or the apparatus may be) the terminal device described in the method 600. In addition, each module or unit in the radio link monitoring apparatus 1300 is configured to perform each action or processing process performed by the terminal device in the method 600. To avoid repetition, details are not described herein again.

In this embodiment of this application, the apparatus 1300 may be a terminal device. The terminal device may include a processor, a transmitter, and a receiver. The processor, the transmitter, and the receiver are in communication connection. Optionally, the terminal device further includes a memory, and the memory and the processor are in communication connection. Optionally, the processor, the memory, the transmitter, and the receiver may be in communication connection. The memory may be configured to store an instruction. The processor is configured to execute the instruction stored in the memory, to control the transmitter to send information or control the receiver to receive a signal.

In this case, the processing unit 1310 of the apparatus 1300 shown in FIG. 23 may correspond to the processor of the terminal device, and the receiving unit 1320 of the apparatus 1300 shown in FIG. 23 may correspond to the receiver of the terminal device.

In this embodiment of this application, the apparatus 1300 may be a chip (or a chip system) installed in a terminal device. In this case, the apparatus 1300 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver may be in communication connection. The memory may be configured to store an instruction. The processor is configured to execute the instruction stored in the memory, to control the transceiver to send information or a signal.

In this case, the processing unit 1310 of the apparatus 1300 shown in FIG. 23 may correspond to the processor, and the receiving unit 1320 of the apparatus 1300 shown in FIG. 22 may correspond to the input/output interface.

Figure 24:
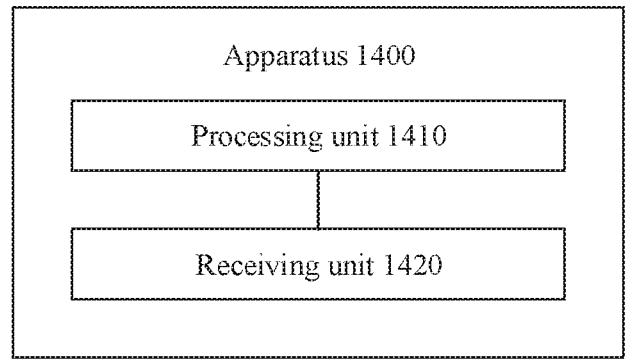

FIG. 24 is a schematic block diagram of a radio link monitoring apparatus 1400 according to an embodiment of this application. As shown in FIG. 24, the apparatus 1400 includes:

a processing unit 1410, configured to perform radio link monitoring RLM in S second bandwidth parts BWPs, where S is an integer greater than 1; and a receiving unit 1420, configured to receive first switching information sent by a network device, where the first switching information is used to indicate that active BWPs include M first BWPs, and M is an integer greater than 1, where the processing unit 1410 is further configured to:
switch from the S second BWPs to the M first BWPs based on the first switching information;

store a measurement result obtained by performing RLM in the S second BWPs, where the measurement result includes a quantity N3 of at least some out of synchronization OOS states or a quantity N4 of at least some in synchronization IS states;

perform RLM in the M first BWPs;

the receiving unit 1420 is further configured to receive second switching information sent by the network device, where the second switching information is used to indicate S1 second BWPs of the S second BWPs, and S1 is an integer greater than or equal to 1; and the processing unit 1410 is further configured to:
switch from the M first BWPs to the S second BWPs based on the second switching information; and perform RLM in the S1 second BWPs based on the measurement result.

In a possible implementation, the processing unit 1410 is specifically configured to:

count, starting from N3, a quantity of consecutive OOS states, where the measurement result includes the quantity N3 of at least some OOS states; or count, starting from N4, a quantity of consecutive IS states, where the measurement result includes the quantity N4 of at least some IS states.

In a possible implementation, the measurement result further includes at least partial duration T3 of total duration recorded from a time at which an RLM timer is enabled to a time at which the RLM timer is stopped; and the processing unit 1410 is specifically configured to: start timing from T3.

The radio link monitoring apparatus 1400 may correspond to (for example, may be configured to or the apparatus may be) the terminal device described in the method 700. In addition, each module or unit in the radio link monitoring apparatus 1400 is configured to perform each action or processing process performed by the terminal device in the method 700. To avoid repetition, details are not described herein again.

In this embodiment of this application, the apparatus 1400 may be a terminal device. The terminal device may include a processor, a transmitter, and a receiver. The processor, the transmitter, and the receiver are in communication connection. Optionally, the terminal device further includes a memory, and the memory and the processor are in communication connection. Optionally, the processor, the memory, the transmitter, and the receiver may be in communication connection. The memory may be configured to store an instruction. The processor is configured to execute the instruction stored in the memory, to control the transmitter to send information or control the receiver to receive a signal.

In this case, the processing unit 1410 of the apparatus 1400 shown in FIG. 24 may correspond to the processor of the terminal device, and the receiving unit 1420 of the apparatus 1400 shown in FIG. 24 may correspond to the receiver of the terminal device.

In this embodiment of this application, the apparatus 1400 may be a chip (or a chip system) installed in a terminal device. In this case, the apparatus 1400 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver may be in communication connection. The memory may be configured to store an instruction. The processor is configured to execute the instruction stored in the memory, to control the transceiver to send information or a signal.

In this case, the processing unit 1410 of the apparatus 1400 shown in FIG. 24 may correspond to the processor, and the receiving unit 1420 of the apparatus 1400 shown in FIG. 24 may correspond to the input/output interface.

Figure 25:
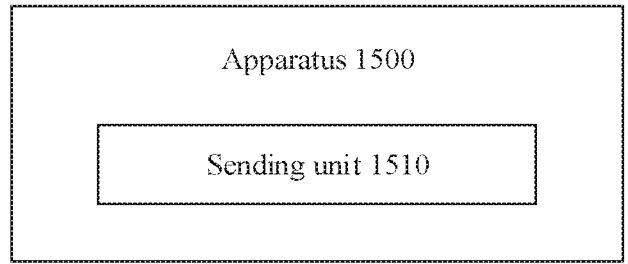

FIG. 25 is a schematic block diagram of a radio link monitoring apparatus 1500 according to an embodiment of this application. As shown in FIG. 25, the apparatus 1500 includes:

a sending unit 1510, configured to send indication information to a terminal device, where the indication information is used to indicate the terminal device to remove, in a process of performing RLM in a first BWP included in an active bandwidth part, a measurement result obtained by the terminal device by performing RLM in a second BWP; and the measurement result includes a quantity N1 of at least some out of synchronization OOS states or a quantity N2 of at least some in synchronization IS states.

The radio link monitoring apparatus 1500 may correspond to (for example, may be configured to or the apparatus may be) the network device described in the method 100. In addition, each module or unit in the radio link monitoring apparatus 1500 is configured to perform each action or processing process performed by the network device in the method 100. To avoid repetition, details are not described herein again.

In this embodiment of this application, the apparatus 1500 may be a network device. The network device may include a processor, a transmitter, and a receiver. The processor, the transmitter, and the receiver are in communication connection. Optionally, the network device further includes a memory, and the memory and the processor are in communication connection. Optionally, the processor, the memory, the transmitter, and the receiver may be in communication connection. The memory may be configured to store an instruction. The processor is configured to execute the instruction stored in the memory, to control the transmitter to send information or control the receiver to receive a signal.

In this case, the sending unit 1510 of the apparatus 1500 shown in FIG. 25 may correspond to the transmitter of the network device.

In this embodiment of this application, the apparatus 1500 may be a chip (or a chip system) installed in a terminal device. In this case, the apparatus 1500 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver may be in communication connection. The memory may be configured to store an instruction. The processor is configured to execute the instruction stored in the memory, to control the transceiver to send information or a signal.

In this case, the sending unit 1510 of the apparatus 1500 shown in FIG. 25 may correspond to the input/output interface.

Figure 26:
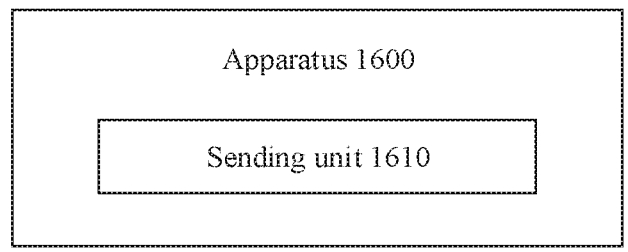

FIG. 26 is a schematic block diagram of a radio link monitoring apparatus 1600 according to an embodiment of this application. As shown in FIG. 26, the apparatus 1600 includes:

a sending unit 1610, configured to send first switching information to a terminal device, where the first switching information is used to indicate that an active bandwidth part BWP includes a first BWP, where the sending unit 1610 is further configured to send indication information to the terminal device, where the indication information is used to indicate the terminal device to continue to use, in a process of performing RLM in the first BWP, a measurement result obtained by performing RLM in a second BWP; and the measurement result includes a quantity N1 of at least some out of synchronization OOS states or a quantity N2 of at least some in synchronization IS states.

The radio link monitoring apparatus 1600 may correspond to (for example, may be configured to or the apparatus may be) the network device described in the method 200. In addition, each module or unit in the radio link monitoring apparatus 1600 is configured to perform each action or processing process performed by the network device in the method 200. To avoid repetition, details are not described herein again.

In this embodiment of this application, the apparatus 1600 may be a network device. The network device may include a processor, a transmitter, and a receiver. The processor, the transmitter, and the receiver are in communication connection. Optionally, the network device further includes a memory, and the memory and the processor are in communication connection. Optionally, the processor, the memory, the transmitter, and the receiver may be in communication connection. The memory may be configured to store an instruction. The processor is configured to execute the instruction stored in the memory, to control the transmitter to send information or control the receiver to receive a signal.

In this case, the sending unit 1610 of the apparatus 1600 shown in FIG. 26 may correspond to the transmitter of the network device.

In this embodiment of this application, the apparatus 1600 may be a chip (or a chip system) installed in a terminal device. In this case, the apparatus 1500 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver may be in communication connection. The memory may be configured to store an instruction. The processor is configured to execute the instruction stored in the memory, to control the transceiver to send information or a signal.

In this case, the sending unit 1610 of the apparatus 1600 shown in FIG. 26 may correspond to the input/output interface.

Figure 27:
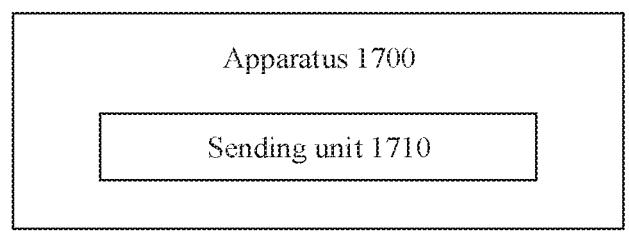

FIG. 27 is a schematic block diagram of a radio link monitoring apparatus 1700 according to an embodiment of this application. As shown in FIG. 27, the apparatus 1700 includes:

a sending unit 1710, configured to send first indication information to a terminal device, where the first indication information is used to indicate that active bandwidth parts BWPs include M BWPs, and M is an integer greater than 1.

In a possible implementation, the sending unit 1710 is further configured to:

send second indication information to the terminal device, where the second indication information is used to indicate K BWPs, and K is less than M.

The radio link monitoring apparatus 1700 may correspond to (for example, may be configured to or the apparatus may be) the network device described in the method 400. In addition, each module or unit in the radio link monitoring apparatus 1700 is configured to perform each action or processing process performed by the network device in the method 400. To avoid repetition, details are not described herein again.

In this embodiment of this application, the apparatus 1700 may be a network device. The network device may include a processor, a transmitter, and a receiver. The processor, the transmitter, and the receiver are in communication connection. Optionally, the terminal device further includes a memory, and the memory and the processor are in communication connection. Optionally, the processor, the memory, the transmitter, and the receiver may be in communication connection. The memory may be configured to store an instruction. The processor is configured to execute the instruction stored in the memory, to control the transmitter to send information or control the receiver to receive a signal.

In this case, the sending unit 1710 of the apparatus 1700 shown in FIG. 27 may correspond to the transmitter of the network device.

In this embodiment of this application, the apparatus 1700 may be a chip (or a chip system) installed in a terminal device. In this case, the apparatus 1700 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver may be in communication connection. The memory may be configured to store an instruction. The processor is configured to execute the instruction stored in the memory, to control the transceiver to send information or a signal.

In this case, the sending unit 1710 of the apparatus 1700 shown in FIG. 27 may correspond to the input/output interface.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes; any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A radio link monitoring method, comprising:
performing, by a terminal device, radio link monitoring (RLM) in a second bandwidth part (BWP);
receiving, by the terminal device, first switching information sent by a network device, wherein the first switching information is used to indicate that an active BWP comprises a first BWP;
switching, by the terminal device, from the second BWP to the first BWP based on the first switching information;
removing, by the terminal device, a measurement result obtained by performing RLM in the second BWP, wherein the measurement result comprises a quantity N1 of one or more out-of-synchronization (OOS) states or a quantity N2 of one or more in-synchronization (IS) states, wherein removing, by the terminal device, the measurement result obtained by performing RLM in the second BWP comprises:
when the measurement result comprises the quantity N1 of one or more out-of-synchronization (OOS) states:
determining, by the terminal device, Q1 as a quantity of consecutive OOS states that is counted by the terminal device by performing RLM in the second BWP; and
counting, by the terminal device starting from P1, a quantity of consecutive OOS states, wherein P1=Q1−N1, and N1 is less than or equal to Q1; or
when the measurement result comprises the quantity N2 of one or more in-synchronization (IS) states:
determining, by the terminal device, Q2 as a quantity of consecutive IS states that is counted by the terminal device by performing RLM in the second BWP; and
counting, by the terminal device starting from P2, a quantity of consecutive IS states, wherein P2=Q2−N2, and N2 is less than or equal to Q2; and
performing, by the terminal device, RLM in the first BWP.

2. The method according to claim 1, wherein the measurement result further comprises at least partial duration T1 of total duration recorded from a time at which an RLM timer is enabled to a time at which the RLM timer is stopped; and
wherein the removing, by the terminal device, a measurement result obtained by performing RLM in the second BWP comprises:
starting, by the terminal device, timing from T2, wherein T2=T−T1, T is the total duration recorded from the time at which the RLM timer is enabled to the time at which the RLM timer is stopped, and T1 is less than or equal to T.

3. The method according to claim 1, wherein the first BWP and the second BWP do not overlap at all or partially overlap.

4. The method according to claim 1, wherein the method further comprises:
receiving, by the terminal device, indication information sent by the network device, wherein the indication information is used to indicate the terminal device to remove the measurement result in a process of performing RLM in the first BWP.

5. A radio link monitoring apparatus, comprising:
a memory storing program instructions; and
at least one processor coupled to the memory, wherein the program instructions, when executed by the at least one processor, cause the apparatus to:
performing radio link monitoring (RLM) in a second bandwidth part (BWP);
receiving first switching information sent by a network device, wherein the first switching information is used to indicate that an active bandwidth part BWP comprises a first BWP;
switching from the second BWP to the first BWP based on the first switching information;
removing a measurement result obtained by performing RLM in the second BWP, wherein the measurement result comprises a quantity N1 of one or more out-of-synchronization (OOS) states or a quantity N2 of one or more in-synchronization (IS) states, wherein removing the measurement result obtained by performing RLM in the second BWP comprises:
when the measurement result comprises the quantity N1 of one or more out-of-synchronization (OOS) states:
determining Q1 as a quantity of consecutive OOS states that is counted by the apparatus by performing RLM in the second BWP; and
counting, starting from P1, a quantity of consecutive OOS states, wherein P1=Q1−N1, and N1 is less than or equal to Q1; or
when the measurement result comprises the quantity N2 of one or more in-synchronization (IS) states:
determining Q2 as a quantity of consecutive IS states that is counted by the apparatus by performing RLM in the second BWP; and
counting, starting from P2, a quantity of consecutive IS states, wherein P2=Q2−N2, and N2 is less than or equal to Q2; and
performing RLM in the first BWP.

6. The apparatus according to claim 5, wherein the measurement result further comprises at least partial duration T1 of total duration recorded from a time at which an RLM timer is enabled to a time at which the RLM timer is stopped; and
wherein the removing a measurement result obtained by performing RLM in the second BWP comprises:
starting timing from T2, wherein T2=T−T1, T is the total duration recorded from the time at which the RLM timer is enabled to the time at which the RLM timer is stopped, and T1 is less than or equal to T.

7. The apparatus according to claim 5, wherein the first BWP and the second BWP do not overlap at all or partially overlap.

* * * * *